US010735322B2

(12) United States Patent
Alstad et al.

(10) Patent No.: US 10,735,322 B2
(45) Date of Patent: Aug. 4, 2020

(54) ACCELERATING HTTP RESPONSES IN A CLIENT/SERVER ENVIRONMENT

(71) Applicant: RADWARE, LTD., Tel Aviv (IL)

(72) Inventors: Kent Alstad, Sechelt (CA); Michael R. Benna, Vancouver (CA)

(73) Assignee: Radware, Ltd., Tel Aviv (IL)

( * ) Notice: Subject to any disclaimer, the term of this patent is extended or adjusted under 35 U.S.C. 154(b) by 434 days.

(21) Appl. No.: 15/394,235

(22) Filed: Dec. 29, 2016

(65) Prior Publication Data

US 2017/0118118 A1 Apr. 27, 2017

Related U.S. Application Data

(63) Continuation of application No. 13/110,524, filed on May 18, 2011, now Pat. No. 9,549,039.

(60) Provisional application No. 61/349,650, filed on May 28, 2010.

(51) Int. Cl.
*H04L 12/801* (2013.01)
*H04L 29/08* (2006.01)
*H04L 29/06* (2006.01)

(52) U.S. Cl.
CPC ............ *H04L 47/10* (2013.01); *H04L 67/28* (2013.01); *H04L 67/2847* (2013.01); *H04L 67/42* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 5,564,070 | A | 10/1996 | Want et al. |
| 5,784,562 | A | 7/1998 | Diener |
| 6,038,601 | A | 3/2000 | Lambert et al. |
| 6,370,687 | B1 | 4/2002 | Shimura |
| 6,385,641 | B1 | 5/2002 | Jiang et al. |
| 6,457,103 | B1 | 9/2002 | Challenger et al. |
| 6,604,143 | B1 | 8/2003 | Nagar et al. |
| 6,618,751 | B1 | 9/2003 | Challenger et al. |
| 6,839,741 | B1 | 1/2005 | Tsai |
| 6,959,318 | B1 | 10/2005 | Tso |

(Continued)

FOREIGN PATENT DOCUMENTS

| | | |
|---|---|---|
| NZ | 566291 | 2/2008 |
| WO | 0178334 A2 | 10/2001 |
| WO | 0186494 | 11/2001 |

OTHER PUBLICATIONS

Canadian Office Action dated Jan. 7, 2013 for Application No. 2,721,872 from Canadian Intellectual Property Office.

(Continued)

*Primary Examiner* — Chi H Pham
*Assistant Examiner* — Raul Rivas
(74) *Attorney, Agent, or Firm* — M&B IP Analysts, LLC

(57) ABSTRACT

A method and system for generating optimization instructions for accelerating traffic between a client and a server. The method includes receiving intercepted responses, wherein each intercepted response is sent by the server in response to a request for content from the client; analyzing the received responses to determine at least a context of each response; compiling at least one optimization instruction based on the determined contexts of the responses; and saving the compiled at least one optimization instruction in a storage device.

25 Claims, 16 Drawing Sheets

(56) References Cited

U.S. PATENT DOCUMENTS

| | | |
|---|---|---|
| 7,043,460 B2 | 5/2006 | Deboer et al. |
| 7,096,418 B1 | 8/2006 | Singhal et al. |
| 7,139,780 B2 | 11/2006 | Lee et al. |
| 7,194,522 B1 | 3/2007 | Swildens et al. |
| 7,266,595 B1 | 9/2007 | Black et al. |
| 7,295,953 B2 | 11/2007 | Cox et al. |
| 7,392,294 B2 | 6/2008 | Hellstrom |
| 7,398,304 B2 | 7/2008 | Smith et al. |
| 7,469,280 B2 | 12/2008 | Simpson |
| 7,711,854 B2 | 5/2010 | Ecklund et al. |
| 7,865,585 B2 | 1/2011 | Samuels et al. |
| 7,886,218 B2 | 2/2011 | Watson |
| 7,895,256 B2 | 2/2011 | Zombek et al. |
| 7,941,609 B2 | 5/2011 | Almog |
| 7,953,820 B2 | 5/2011 | Stevens et al. |
| 8,001,175 B2 | 8/2011 | Betancourt et al. |
| 2002/0062384 A1 | 5/2002 | Tso |
| 2002/0065899 A1 | 5/2002 | Smith et al. |
| 2002/0156881 A1 | 10/2002 | Lemon et al. |
| 2003/0004937 A1 | 1/2003 | Salmenkaita et al. |
| 2003/0004998 A1 | 1/2003 | Datta |
| 2003/0040995 A1 | 2/2003 | Daddario et al. |
| 2003/0065810 A1 | 4/2003 | Ims et al. |
| 2003/0078964 A1 | 4/2003 | Parrella et al. |
| 2003/0191812 A1 | 10/2003 | Agarwalla et al. |
| 2003/0204769 A1 | 10/2003 | Coughlin |
| 2003/0225897 A1 | 12/2003 | Krawetz |
| 2004/0043758 A1 | 3/2004 | Sorvari et al. |
| 2004/0117438 A1 | 6/2004 | Considine et al. |
| 2004/0205165 A1 | 10/2004 | Melamed et al. |
| 2004/0236824 A1 | 11/2004 | Millington et al. |
| 2004/0268357 A1 | 12/2004 | Joy et al. |
| 2005/0033855 A1 | 2/2005 | Moradi et al. |
| 2005/0044242 A1 | 2/2005 | Stevens et al. |
| 2005/0108335 A1 | 5/2005 | Naick et al. |
| 2005/0138033 A1 | 6/2005 | Katta et al. |
| 2005/0188048 A1 | 8/2005 | Yuan et al. |
| 2005/0210243 A1 | 9/2005 | Archard et al. |
| 2005/0261985 A1 | 11/2005 | Miller et al. |
| 2006/0015512 A1 | 1/2006 | Alon et al. |
| 2006/0090033 A1 | 4/2006 | Betancourt et al. |
| 2006/0095527 A1 | 5/2006 | Malik |
| 2006/0143290 A1 | 6/2006 | Dostert et al. |
| 2006/0212149 A1 | 9/2006 | Hicken et al. |
| 2006/0212601 A1 | 9/2006 | Hampton |
| 2006/0224723 A1 | 10/2006 | Chen |
| 2006/0225065 A1 | 10/2006 | Chandhok et al. |
| 2006/0235941 A1 | 10/2006 | Arcas et al. |
| 2007/0005603 A1 | 1/2007 | Jain et al. |
| 2007/0174644 A1 | 7/2007 | Willig |
| 2007/0180035 A1 | 8/2007 | Liu et al. |
| 2007/0198716 A1 | 8/2007 | Knowles et al. |
| 2007/0260748 A1 | 11/2007 | Talkington |
| 2007/0268865 A1 | 11/2007 | Garcia et al. |
| 2007/0291741 A1 | 12/2007 | Hwang |
| 2008/0008109 A1 | 1/2008 | Ollis |
| 2008/0016240 A1 | 1/2008 | Balandin |
| 2008/0208789 A1 | 8/2008 | Almog |
| 2008/0208961 A1 | 8/2008 | Kim et al. |
| 2008/0209120 A1 | 8/2008 | Almog et al. |
| 2009/0132658 A1 | 5/2009 | Glickstein |
| 2009/0254707 A1 | 10/2009 | Alstad |
| 2009/0270076 A1 | 10/2009 | Zhou et al. |
| 2009/0276488 A1* | 11/2009 | Alstad .................. H04L 67/303 709/203 |
| 2010/0180082 A1 | 7/2010 | Sebastian et al. |
| 2010/0211597 A1* | 8/2010 | Huoviala ............ H04L 12/5692 707/769 |
| 2010/0281224 A1 | 11/2010 | Ho et al. |
| 2011/0035441 A1 | 2/2011 | Osuga |
| 2011/0295979 A1 | 12/2011 | Alstad et al. |
| 2012/0102009 A1 | 4/2012 | Peterson et al. |
| 2012/0303697 A1 | 11/2012 | Alstad |
| 2013/0086197 A1 | 4/2013 | Ho et al. |

OTHER PUBLICATIONS

Loon et al.; "Alleviating the Latency and Bandwidth Problems in WWW Browsing," USENIX Symposium on Internet Technologies and Systems; Dec. 8-11, 1997, pp. 219-230.

Office Action for the Corresponding Canadian Patent Application No. 2,721,872; Canadian Intellectual Property Office; dated Mar. 6, 2014.

Supplementary European Search Report, dated Feb. 21, 2014, Application No. EP 09 74 1610.

Sustersic et al.; "An Analysis of Internet Data Update Behaviors," Proceedings of the 20th International Conference on Advanced Information Networking and Applications (AINA '06); 2006.

"Optimize Caching", Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Jung, et al., "Generating Adaptation Policies for Multi-Tier Applications in Consolidated Server Environments", In Proceedings of the 5th IEEE International Conference on Automatic Computing, Jun. 2-6, 2008, pp. 23-32.

Xue Liu, et al., "Online Response Time Optimization of Apache Web Server", Proceedings of the 11th international conference on Quality of service, 2003, Springer-Verlag, pp. 461-478.

* cited by examiner

Unaccelerated Sequence 302

Learning Sequence (part 2)
303

**Accelerated Sequence (part 1)
304**

Accelerated Sequence (part 2)
304

**Alternate Accelerated Sequence
(Using HTTP Headers)
304B**

Exception Sequence (part 1)
305

Exception Sequence (part 2)
305

Alternate Edge Accelerated Sequence 306

ACCELERATING HTTP RESPONSES IN A CLIENT/SERVER ENVIRONMENT

CROSS-REFERENCE TO RELATED APPLICATIONS

The present application is a continuation of U.S. patent application Ser. No. 13/110,524 Filed May 18, 2011, which claims priority from U.S. Provisional Application Ser. No. 61/349,650 filed May 28, 2010, the disclosure of which is incorporated herein by reference.

The present application is related to U.S. Utility application Ser. No. 12/426,909 filed Apr. 20, 2009, the disclosure of which is incorporated herein by reference.

TECHNICAL FIELD

The present disclosure relates to optimizing performance and response time when presenting content in a client/server environment.

BACKGROUND

Conventionally, in client-server network systems, such as the Internet, HTTP clients such as web browsers render HTTP responses including HTML content, such as web pages received from web servers. In rendering a web page or other content, the client requests the HTML content from the web server, and then renders and displays the content for the user.

Often, the initial request and response only supplies a portion of the content, and the client must request additional resources, such as images, script files, and cascading style sheets. Often, the original response from the server specifies what additional resources are needed. If any of these resources are already stored in a local cache at the client (such as the browser cache), then the browser can simply retrieve the needed data from the cache without making an additional request to a server. If some or all of the resources are not available from a local cache, they are retrieved from servers across the network. The process of requesting and receiving these additional resources from servers can add significantly to the time required to render the response, since the browser must wait for the resources to arrive before rendering can take place.

SUMMARY

The various embodiments disclosed herein include a method for generating optimization instructions for accelerating traffic between a client and a server. The method comprises: receiving intercepted responses, wherein each intercepted response is sent by the server in response to a request for content from the client; analyzing the received responses to determine at least a context of each response; compiling at least one optimization instruction based on the determined contexts of the responses; and saving the compiled at least one optimization instruction in a storage device.

The various embodiments disclosed herein also include a non-transitory computer readable medium having stored thereon instructions for causing a processing circuitry to perform a process for generating optimization instructions for accelerating traffic between a client and a server, the process comprising: receiving intercepted responses, wherein each intercepted response is sent by the server in response to a request for content from the client; analyzing the received responses to determine at least a context of each response; compiling at least one optimization instruction based on the determined contexts of the responses; and saving the compiled at least one optimization instruction in a storage device.

The various embodiments disclosed herein also include a system for generating optimization instructions for accelerating traffic between a client and a server, comprising: a processing circuitry; and a memory, the memory containing instructions that, when executed by the processing circuitry, configure the system to: receive intercepted responses, wherein each intercepted response is sent by the server in response to a request for content from the client; analyze the received responses to determine at least a context of each response; compile at least one optimization instruction based on the determined contexts of the responses; and save the compiled at least one optimization instruction in a storage device.

One skilled in the art will recognize that the automated optimization techniques described herein can be applied to other scenarios and conditions, and are not limited to the specific examples discussed herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention. In particular, the sequence diagrams provided herein are intended to show an example of a particular sequence of events that can be used to implement the invention. One skilled in the art will recognize, however, that the events can take place in a different sequence, and/or that some events can be omitted and/or others added, without departing from the essential characteristics of the invention as set forth in the claims.

DETAILED DESCRIPTION OF THE EMBODIMENTS

In the examples and drawings presented herein, the present invention is described in connection with mechanisms for optimizing HTTP response messages, such as HTML messages transmitted over the Internet in response to client requests. Particular examples are set forth in which a user accesses a website via client software such as a browser. However, one skilled in the art will recognize that the methods of the present invention can also be applied to other forms of optimization and to systems using protocols other than HTTP. In addition, in various examples, the present invention is described herein as a mechanism for transmitting HeadStart and/or EdgeStart responses so as to improve perceived response time in rendering web pages; however, in other embodiments the present invention can be used to achieve other optimization and performance improvement goals.

For illustrative purposes, the following description sets forth the invention in terms of automated acceleration when rendering HTML content, such as web pages, served via HTTP. However, one skilled in the art will recognize that the techniques described herein can be applied to other types of content delivered across any electronic network.

System Architecture

Figure 1A:
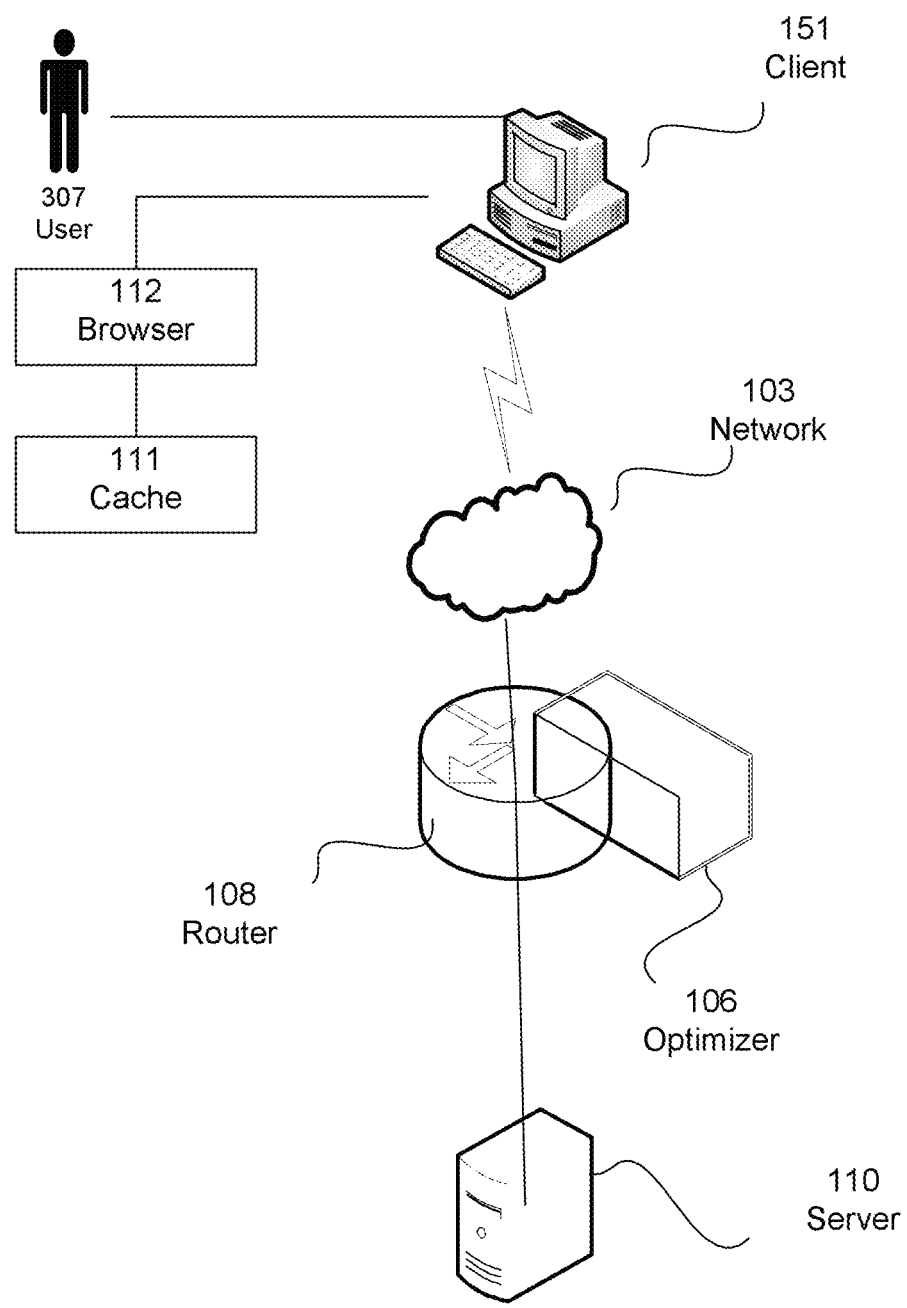
FIG. 1A depicts an architecture for practicing the various disclosed embodiments, wherein an optimizer for performing optimization resides in a network device such as a router.

Referring now to FIG. 1A, there is shown an architecture for practicing the present invention according to one embodiment, wherein an optimizer 106 for performing the techniques of the present invention resides in a network device such as router 108. As depicted in FIG. 1A, in such a configuration, optimizer 106 is positioned between server 110 and client machine 151. Server 110 may be an HTTP server, web server, or other server; client machine 151 may be an HTTP client or any other electronic device capable of sending and receiving messages on network 103. Network 103 may be the Internet or any other network that enables communication among two or more electronic devices. Network 103 may be implemented using well-known network protocols such as Hypertext Transfer Protocol (HTTP), Secure Hypertext Transfer Protocol (SHTTP), Transmission Control Protocol/Internet Protocol (TCP/IP), and/or the like. In some embodiments, secure access to network 103 may be facilitated via well known techniques such as a Virtual Private Network (VPN), although such secure access is not required.

Client 151 and/or server 110 may be computers or any other electronic devices. Examples include, without limitation, a desktop computer, laptop computer, personal digital assistant (PDA), cellular telephone, smartphone, music player, handheld computer, tablet computer, kiosk, game system, enterprise computing system, server computer, or the like. In one embodiment, client 151 and/or server 110 are desktop computers running an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on such devices. In one embodiment, client 151 includes local cache 111, which can be used for storing resources retrieved from server 110 for later use; cache 111 can be implemented at client 151 according to well-known methods.

In one embodiment, client 151 and/or server 110 each include a number of hardware components as are well known to those skilled in the art, including for example one or more input devices (such as a keyboard, mouse, touch-screen, trackball, trackpad, five-way switch, voice input device, joystick, and/or any combination thereof), one or more output devices (such as a screen, speaker, printer, and/or any combination thereof), one or more processors (which can be a conventional microprocessor for performing operations on data under the direction of software, according to well-known techniques), memory (such as random-access memory having a structure and architecture as are known in the art, for use by the one or more processors in the course of running software), and/or local storage (which can be any magnetic, optical, and/or electrical storage device for storage of data in digital form, such as flash memory, magnetic hard drive, CD-ROM, and/or the like). Such components are well known in the art of computing architecture and are thus omitted from FIG. 1A for clarity.

One skilled in the art will recognize that the particular arrangement of hardware elements shown in FIG. 1A is merely exemplary, and that the invention can be implemented using different hardware elements configured in any of a number of different ways. Thus, the particular architecture shown in FIG. 1A is merely illustrative and is not intended to limit the scope of the invention in any way.

One skilled in the art will recognize that any number of devices, singly or in any combination, may be configured to fulfill the roles of client 151 and/or server 110 described herein without departing from the scope of the present invention.

In one embodiment, client 151 operates under the direction and control of user 307, who interacts with client 151 via a user interface according to well-known techniques.

Client 151 may run web browser 112 and/or another software application for enabling network communications. For illustrative purposes, the invention is described herein in terms of a request for a web page issued by browser 112 running on client 151. In one embodiment, cache 111 is associated with browser 112, although cache 111 can be separate from browser 112 and can be any local cache for use by client 151.

In one embodiment, router 108 is implemented as a computing device configured to route network traffic between client 151 and server 110 according to well known mechanisms. Router 108 may include optimization and acceleration components as described in related U.S. Utility application Ser. No. 12/426,909 for "Extensible, Asynchronous, Centralized Analysis and Optimization of Server Responses to Client Requests,", filed Apr. 20, 2009, the disclosure of which is incorporated herein by reference. Such components may include, for example, optimizer 106 as described in the related application.

In one embodiment, optimizer 106 can be implemented as a software-based component of router 108. Accordingly, router 108 may include a processor (not shown) for performing the techniques of the present invention in accordance with software and/or firmware instructions.

Figure 1B:
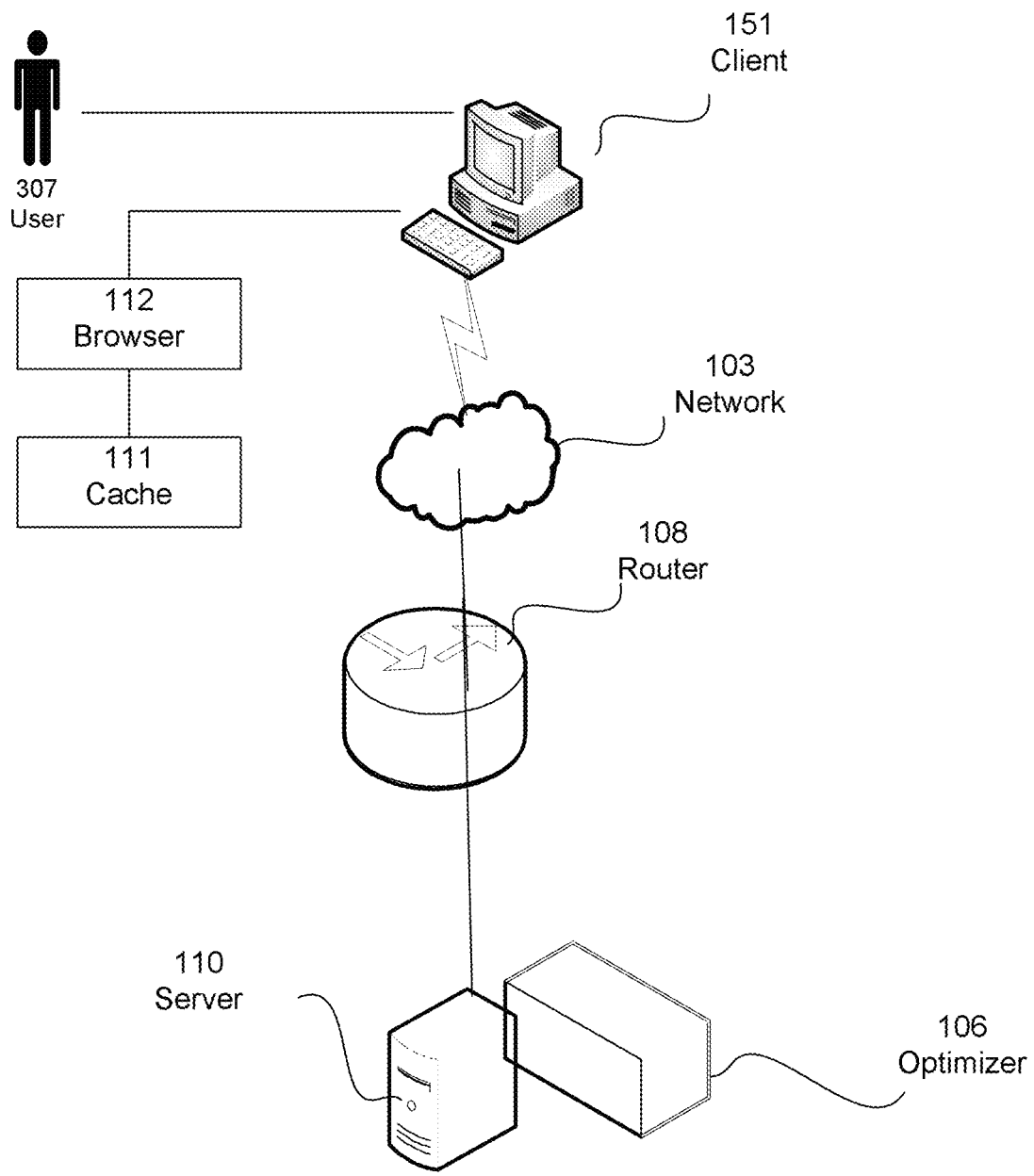
FIG. 1B depicts an architecture for practicing the various disclosed embodiments, wherein an optimizer for performing optimization resides in a server.

Referring now to FIG. 1B, there is shown an architecture for practicing the present invention according to another embodiment, wherein optimizer 106 resides in server 110.

One skilled in the art will recognize that the techniques of the present invention can be implemented in an optimizer 106 or other component having any suitable location within the overall network architecture, and that the particular arrangements shown in FIGS. 1A and 1B are merely exemplary. For example, optimizer 106 can be implemented as part of a stand-alone network appliance located in the communication path between client 151 and server 110. Optimizer 106 can also be implemented using any number of network appliances and/or other components in any suitable combination.

Figure 2A:
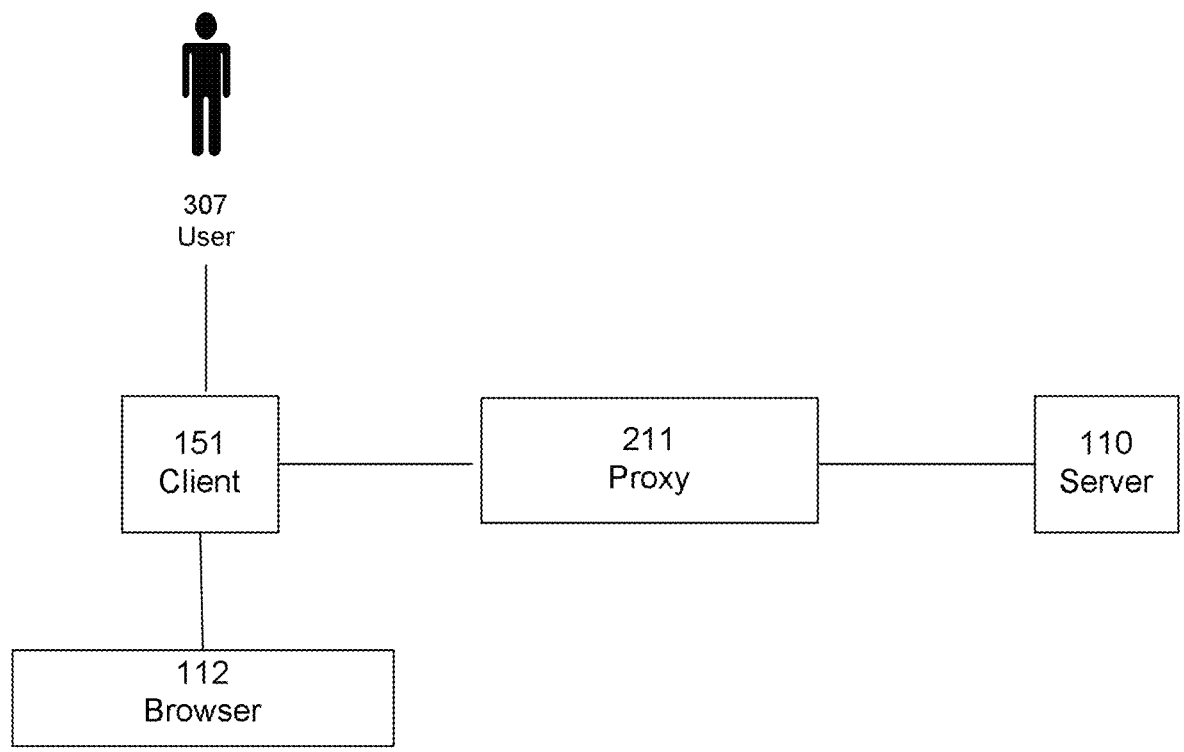
FIG. 2A is a block diagram depicting a conceptual architecture for implementing the present invention according to one embodiment.

Referring now to FIG. 2A, there is shown a block diagram depicting a conceptual architecture for implementing the present invention according to one embodiment. Client 151 can run browser software 112 for providing access to web pages and other resources on server 110. Server 110 may be a web server or any other type of server. User 307 interacts with client 151, for example by typing URLs and clicking on links within browser software 112. In response to such actions, client 151 makes requests of resources from server 110. Proxy 211 acts as an intermediary and performing other operations such as modifying the request on its way to server 110. In one embodiment, proxy 211 intercepts client 151 requests that are addressed to server 110. In one embodiment, proxy 211 can include, for example, an accelerator proxy and/or edge accelerator proxy, as described in more detail herein. Proxy 211 can be implemented as part of optimizer 106, or it can be a separate component.

Figure 2B:
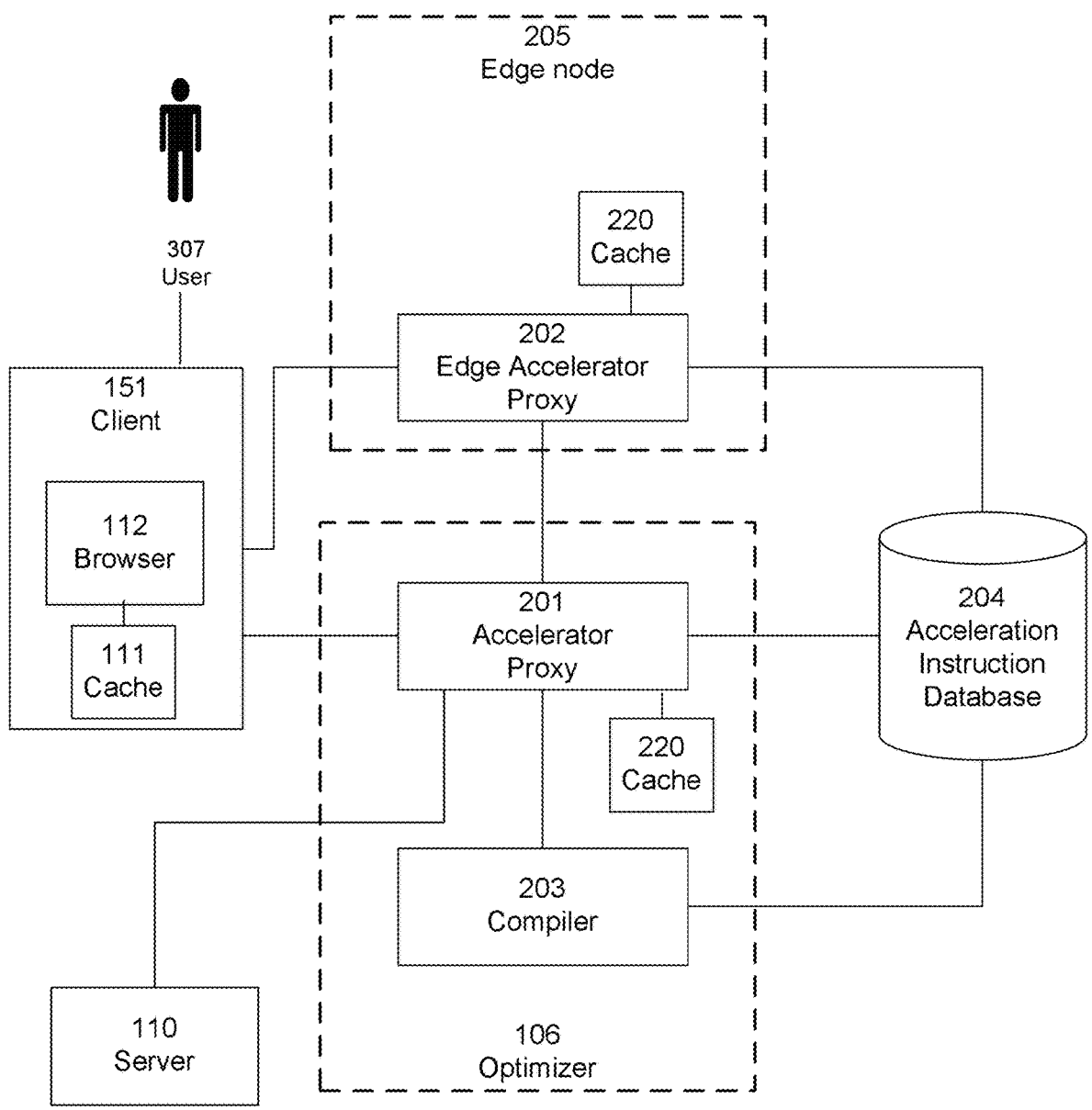
FIG. 2B is a block diagram depicting an architecture for a network optimizer according to one embodiment.

Referring now to FIG. 2B, there is shown a block diagram depicting an architecture for optimizer 106 according to one embodiment of the present invention. The particular architecture depicted in FIG. 2B is merely exemplary, but can be implemented according to the techniques of the present invention regardless of whether optimizer 106 is situated within router 108, server 110, or at any other location in the network.

As shown in FIG. 2B, in one embodiment optimizer 106 includes:
- accelerator proxy 201, configured to receive and handle requests from client 151 in accordance with techniques described herein; and
- compiler 203, configured to generate optimization instructions for use by accelerator proxy 201.

Accelerator proxy 201 is a specialized HTTP proxy configured to capture HTML responses and send captures to compiler 203, which generates and saves instructions in acceleration instruction database 204. In one embodiment, accelerator proxy 201 evaluates requests and retrieves any previously stored acceleration instruction(s) mapped to that request. Such acceleration instruction(s) can contain a list of resources, referred to herein as a HeadStart response or a HeadStart list; the HeadStart response can be provided as an HTML fragment for responding to the request, as described in more detail below. The HeadStart response may be transmitted using chunked encoding, or via HTTP headers, or by some other means, as described in more detail below.

Compiler 203 transforms HTTP response context samples (HTML text and HTTP headers) into a HeadStart list, and may also generate additional optimization instructions. As mentioned above, in one embodiment, compiler 203 saves instructions in acceleration instruction database 204.

In one embodiment, compiler 203 can be omitted, and instructions in acceleration instruction database 204 can be generated based on manually entered data that forms part of a static configuration. Such manual data can be specified, for example, in the form of an XML configuration document or by any other suitable means.

In one embodiment, the system of the present invention also includes edge accelerator proxy 202, configured to generate and transmit initial (EdgeStart) responses to client 151 so as to further improve response time, in accordance with techniques described herein. Edge accelerator proxy 202 is a modified version of accelerator proxy 201. In one embodiment, edge accelerator proxy 202 is configured and situated so that it can more quickly respond to client 151 requests. For example, accelerator proxy 202 can be located at a logical network location closer to client 151 (such a location may be referred to as an "edge node" 205). In one embodiment, edge accelerator proxy 202 can be configured to perform a subset of optimization operations which do not require requests to be made to server 110 and which are determined to be particularly suited for a device that is logically proximate to client 151; for example, accelerator proxy 202 can be restricted to classifying and applying pre-calculated or pre-configured HeadStart optimizations. In one embodiment, edge accelerator proxy 202 is an optional extension to the system of the present invention, and can be omitted. In one embodiment, client 151 can receive HeadStart HTML sections from edge accelerator proxy 202 and other page sections from other servers. In one embodiment, acceleration instruction database 204 may be positioned to be logically and/or geographically proximate to edge accelerator proxy 202 so as to provide fast access to acceleration instructions.

In one embodiment, accelerator proxy 201 and/or edge accelerator proxy 202 may include cache 220 for storing resources that may be of use to client 151 in rendering content, as described in more detail below.

For illustrative purposes, edge accelerator proxy 202 is depicted in FIG. 2B as being installed within an edge node 205 rather than as a component of optimizer 106. However, in various embodiments, edge accelerator proxy 202 can be implemented as a component of optimizer 106, or as a separate component that may be local or remote with respect to optimizer 106. In yet another embodiment, edge accelerator proxy 202 may be omitted entirely.

In one embodiment, acceleration instruction database 204 is a fast access persistent data store that uses key-value mapping to resolve requests for acceleration instructions. In one embodiment, instructions are stored during a learning sequence and retrieved during subsequent accelerated or edge accelerated sequences, as described in more detail below. In another embodiment, instructions are configured manually.

One skilled in the art will recognize that some or all of the components depicted in FIG. 2B can be omitted without departing from the essential characteristics of the present invention. For example and without limitation, edge accelerator proxy 202 can be omitted from some embodiments. Also, compiler 203 can be omitted, for example if optimization instructions are not used.

In one embodiment, proxy 201 includes a rewriter (not shown) for applying optimization instructions to server responses.

Each of these components can be implemented using any combination of hardware, firmware, and software. For example, the components may be implemented as software modules for controlling the operation of a processor in optimizer 106.

HeadStart Responses

In one embodiment, accelerator proxy 201 transmits an initial response (referred to herein as a HeadStart response or HeadStart list) to client 151 before server 110 has generated and returned a complete response to the client's

151 request. The HeadStart response can include, for example a list of links for resources to be used in rendering the HTML page. The HeadStart response thus serves as a trigger to cause client 151 to begin loading resources that will be needed in rendering the web page. In this manner, the system of the present invention allows client 151 to begin requesting additional resources while server 110 is still composing portions of the HTML page.

In one embodiment, the HeadStart response is a new section, referred to as a HeadStart section, which accelerator proxy 201 adds to the beginning of the HTML page being returned to client 151. This section may be hidden, so that it does not appear on the rendered page. In one embodiment, chunked encoding can be used, so that the HeadStart section can be transmitted prior to the remainder of the HTML page. Chunked encoding allows a portion of an HTML page to be transmitted while the remainder of the page is still being composed and may not yet be available. In one embodiment, the HeadStart section includes links to resources to be used by browser 112 running at client 151 to render the page. Placing the HeadStart section at the top of the page causes browser 112 to process that section prior to other sections, so that the resources identified in the HeadStart section can be requested and obtained earlier.

In another embodiment, the HeadStart response is a separate document from the main HTML response, so that two separate documents are returned to client 151.

The following is an example of HTML code including a HeadStart section, according to one embodiment.

```
<!DOCTYPE html PUBLIC "-//W3C//DTD XHTML 1.0 Strict//EN"
"http://www.w3.org/TR/xhtml1/DTD/xhtml1-strict.dtd">
<!-- Begin HeadStart Chunk -->
<html xmlns="http://www.w3.org/1999/xhtml" xml:lang="en" lang="en">
<head>
    <!-- Add references to all the JavaScript to HeadStart here. -->
    <script type="text/javascript">
    //<![CDATA[
    var js = document.createElement('script'); js.src = '/Js1.js';
    var js = document.createElement('script'); js.src = '/Js2.js';
    //]]>
    </script>
    <!-- Add references to all the Css to HeadStart here. -->
    <link type="text/css" rel="stylesheet" href="/css1.css" />
    <link type="text/css" rel="stylesheet" href="/css2.css" />
    <link type="text/css" rel="stylesheet" href="/css3.css" />
</head>
<div style="display:none;">
    <!-- Add references to all the images to HeadStart here. -->
    <img src="/image1.jpg" />
    <img src="/image2.gif" />
    <img src="/image3.png" />
</div>
</html>
<!-- End HeadStart Chunk -->
<!-- Begin Original Html Chunk -->
<html xmlns="http://www.w3.org/1999/xhtml" xml:lang="en" lang="en">
<head>
    <meta http-equiv="content-type" content="text/html; charset=UTF-8" />
    <title>Test Site</title>
    <!-- This time the JavaScript is loaded from the local browser cache. -->
        <script src="/Js1.js" type="text/javascript"></script>
    <!-- This time the css files are loaded from the local browser cache. -->
    <link type="text/css" rel="stylesheet" href="/css1.css" />
    <link type="text/css" rel="stylesheet" href="/css2.css" />
    <link type="text/css" rel="stylesheet" href="/css3.css" />
</head>
<body>
    <form name="form1" method="post" action="index.aspx" id="form1">
    <div>
        <input type="hidden" name="__VIEWSTATE" id="__VIEWSTATE" value="000002VCZYXVE" />
    </div>
    <div id="header">
        <div class="core">
            <a href="#">Chunked HeadStart Html Example</a>
        </div>
    </div>
    <div id="main-content">
        <div class="primary">
            <div class="img-test">
                <h1>Image tests</h1>
                <!-- This time the images are loaded from the local browser cache. -->
                <img src="/image1.jpg" />
                <img src="/image2.gif" />
                <img src="/image3.png" />
            </div>
            <script src="/Js2.js" type="text/javascript"></script>
        </div>
    </div>
```

```
    </form>
  </body>
</html>
```

In the above example, the HTML code is provided in a single page including two sections: a HeadStart chunk and an original chunk. Each section is delineated by a separate set of start and end <html> tags. The HeadStart chunk includes a list of links to resources for client 151 to retrieve.

Such a format is merely one example of how HTML can be formed by the system of the present invention. One skilled in the art will recognize that the HeadStart response can be generated and provided in many other formats. In one embodiment, a floating HTML fragment contains the HeadStart response. In another embodiment, a hidden IFrame contains the HeadStart response. In another embodiment, the main document contains a hidden HeadStart section and the original page content is in an IFrame. In another embodiment, a separate HTML page contains the HeadStart response; this separate document contains a redirection instruction causing client 151 to redirect to a separate page containing the original content. In yet another embodiment, the HeadStart response is implemented in HTTP headers.

In one embodiment, the HeadStart response can include instructions to cause the web browser to indicate to the user that loading is in progress, for example as a text or graphical progress indicator, as a text message, or by otherwise changing the display.

Use Cases

Figure 3:
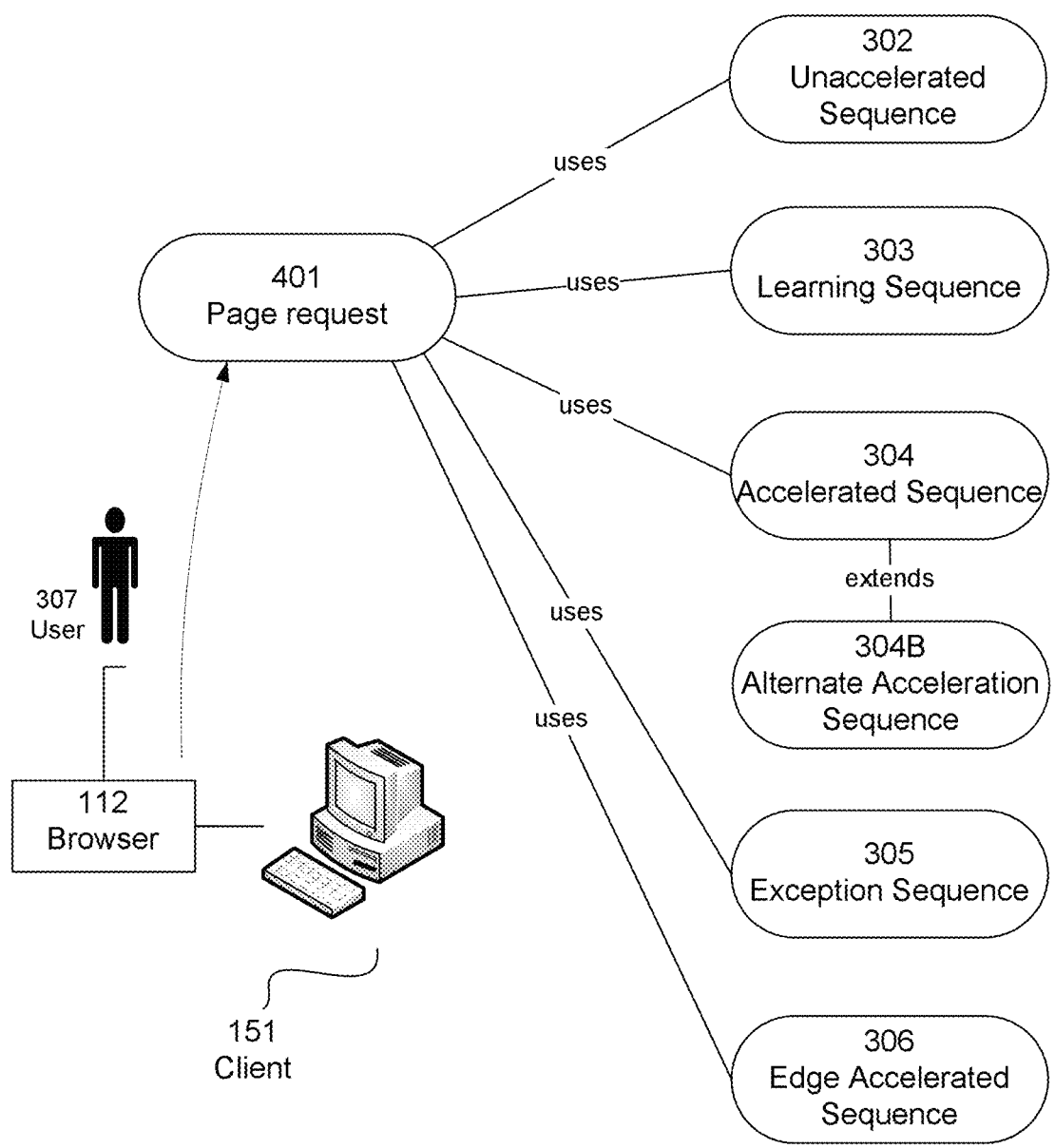
FIG. 3 is a flow diagram depicting various use cases and activities associated with the invention.

Referring now to FIG. 3, there is shown a diagram depicting various use cases and activities associated with the invention. User 307 interacts with browser 112 running on client 151, to view HTML web pages provided by a server via an HTTP-enabled network such as the Internet. As described above, in one embodiment, the system of the present invention is implemented using a network appliance or other component configured as optimizer 106 for implementing the present invention, so that no special software need be installed at client 151.

FIG. 3 depicts several use cases for performing the various functions associated with the present invention. Each use case is performed in response to a page request 401 issued by client 151. One skilled in the art will recognize that these use cases are merely exemplary, and that other use cases can be implemented for performing various additional functionality.

Unaccelerated Sequence 302.

Unaccelerated sequence 302 represents the normal flow of actions during the course of an HTTP transaction for handling page request 401. This sequence is described in more detail in connection with FIG. 4.

Learning Sequence 303.

Learning sequence 303 is substantially the same as unaccelerated sequence 302, except that a context for the HTTP response is captured and sent to compiler 203 for processing. Compiler 203 generates an acceleration instruction that contains a HeadStart response (consisting, for example, of HTML code) including a list of resources and actions tailored for accelerating the HTML response, based on the captured context. Once compiler 203 has generated the acceleration instruction, the acceleration instruction is saved in an acceleration instruction database 204. In one embodiment, accelerator proxy 201 has fast access to the acceleration instruction database 204 and can utilize the stored acceleration instructions to accelerate responses to subsequent requests. In addition to resources that are discovered by capturing the response context, in one embodiment a manually configured list of resources can also be included in HeadStart optimizations. This sequence is described in more detail in connection with FIGS. 5A and 5B.

Accelerated Sequences 304, 304B.

In accelerated sequences, accelerator proxy 201 applies acceleration instruction that have previously been saved. In one embodiment, as described in connection with FIGS. 6A and 6B, accelerated sequence 304 uses chunked encoding to provide HeadStart chunks before the remainder of the page is ready, thereby allowing client 151 to begin processing the HeadStart chunk concurrently server 110 composing the remainder of the HTML page. In another embodiment, as described in connection with FIG. 7, alternate accelerated sequence 304B uses HTTP headers (rather than chunks) to provide the HeadStart response.

Exception Sequence 305.

This use case arises when server 110 encounters an error or returns an unexpected response (referred to as a "non-200" response). This sequence is described in more detail in connection with FIGS. 8A and 8B.

Edge Accelerated Sequence 306.

In one embodiment, the present invention can be implemented in an "edge" network configuration, wherein multiple servers are geographically dispersed and content is stored at and served from nodes that are logically (and/or geographically) closer to the client 151 making the request. In such an architecture, edge accelerator proxy 202 can be used to process and return HeadStart content from the edge node (that node that is designated to respond to the request). Remaining content may be returned from other servers. This sequence is described in more detail in connection with FIGS. 9A, 9B, and 10.

Methods of Operation

FIGS. 4 through 10 are event trace diagrams depicting the various sequences in additional detail. One skilled in the art will recognize that the specific steps as shown, and their sequence, are merely exemplary, and that the present invention can be implemented in other ways and using other sequences of steps. In one embodiment, the steps depicted in FIGS. 4 through 10 are performed by optimizer 106 and its various components; however, the steps of the present invention can be performed by other systems and components.

Unaccelerated Sequence 302

Figure 4:
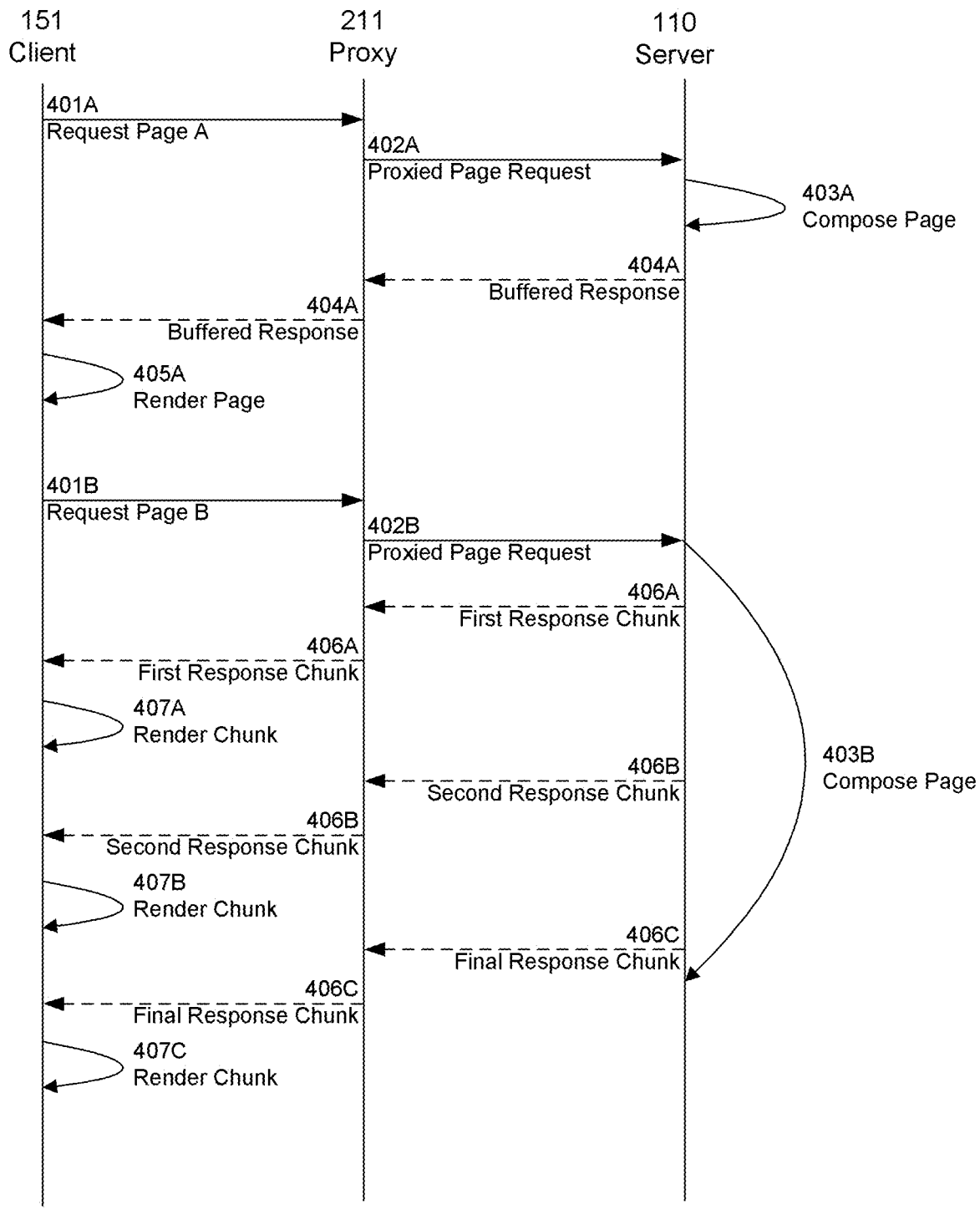
FIG. 4 is a sequence diagram illustrating an unaccelerated sequence for handling page requests according to one embodiment.

Referring now to FIG. 4, there is shown an example of unaccelerated sequence 302 including the normal flow of actions during the course of an HTTP transaction. Sequence 302 can be implemented using the architecture of FIG. 2B or the conceptual architecture shown in FIG. 2A. Thus, proxy 211 depicted in FIG. 4 can be any suitable proxy, including accelerator proxy 201 or a conventional unaccelerated proxy 211.

FIG. 4 depicts two types of responses: buffered and chunked-encoded. In a buffered response (steps 401A through 405A), server 110 composes the entire web page before any data is transmitted to client 151. Thus, in response to request 401A for page A from client 151, proxy 211 forwards proxied page request 402A to server 110. Server 110 composes 403A the web page and transmits buffered response 404A containing the composed page to proxy 211. Proxy 211 forwards buffered response 404A to client 151, which renders 405A the page (for example at browser 112).

In a chunked-encoded response (steps 401B through 407C), server 110 returns chunks sequentially while it continues to compose the web page. Thus, as shown in the example, in response to request 401B for page B from client 151, proxy 211 forwards proxied page request 402B to server 110. Server 110 composes 403B the web page, but returns the composed web page in a series of response chunks 406A, 406B, 406C. Any number of such chunks 406 can be used; the example shows three chunks 406 for illustrative purposes. Response chunks 406A, 406B can be returned while server 110 continues to compose 403B the web page, with chunk 406C representing the final response chunk. As depicted in FIG. 4, proxy 211 forwards each response chunk 406 to client 151, which renders 407A, 407B, 407C each chunk as it is received. Chunked encoding enables client 151 to begin rendering the web page while server 110 is still composing the web page.

In the process of rendering pages 405 and rendering chunks 407, client 151 renders content on a display screen and may also fetch external resources from remote servers. In the unaccelerated sequence depicted in FIG. 4, the fetching of external resources does not take place until client 151 receives references to those external resources as part of response 404A and 406. Note that in the example of the buffered response 404A, none of the response is sent to client 151 until after server 110 has fully composed 403 the web page and transmitted buffered response 404A. In the example of a chunked response 406, client 151 may not receive references to external resources until server 110 composes the chunk of response 406 which references those external resources and corresponding response chunk 406 is fully transmitted to client 151. Thus, in the unaccelerated sequence, even when chunked-encoded responses are used, the first actions on the browser do not occur until server 110 has responded. This causes overall page load time in the unaccelerated sequence to be dependent on server-side response-creation speed plus subsequent resource fetching speed. In various embodiments, the system of the present invention addresses these issues, as described herein.

Learning Sequence 303

Figure 5A:
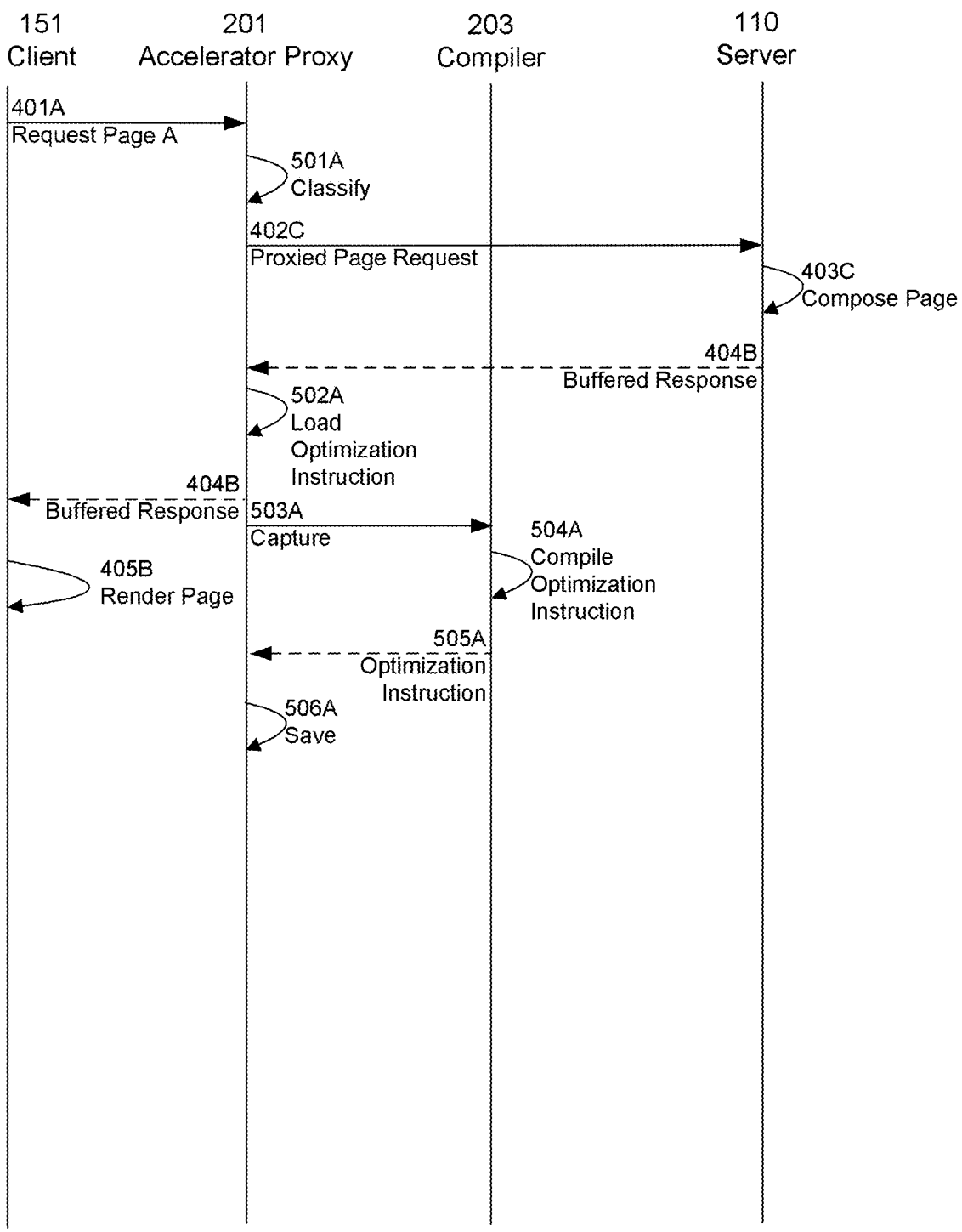
FIGS. 5A and 5B are sequence diagrams illustrating a learning sequence for generating optimization instructions for handling server responses, according to one embodiment.
Figure 5B:
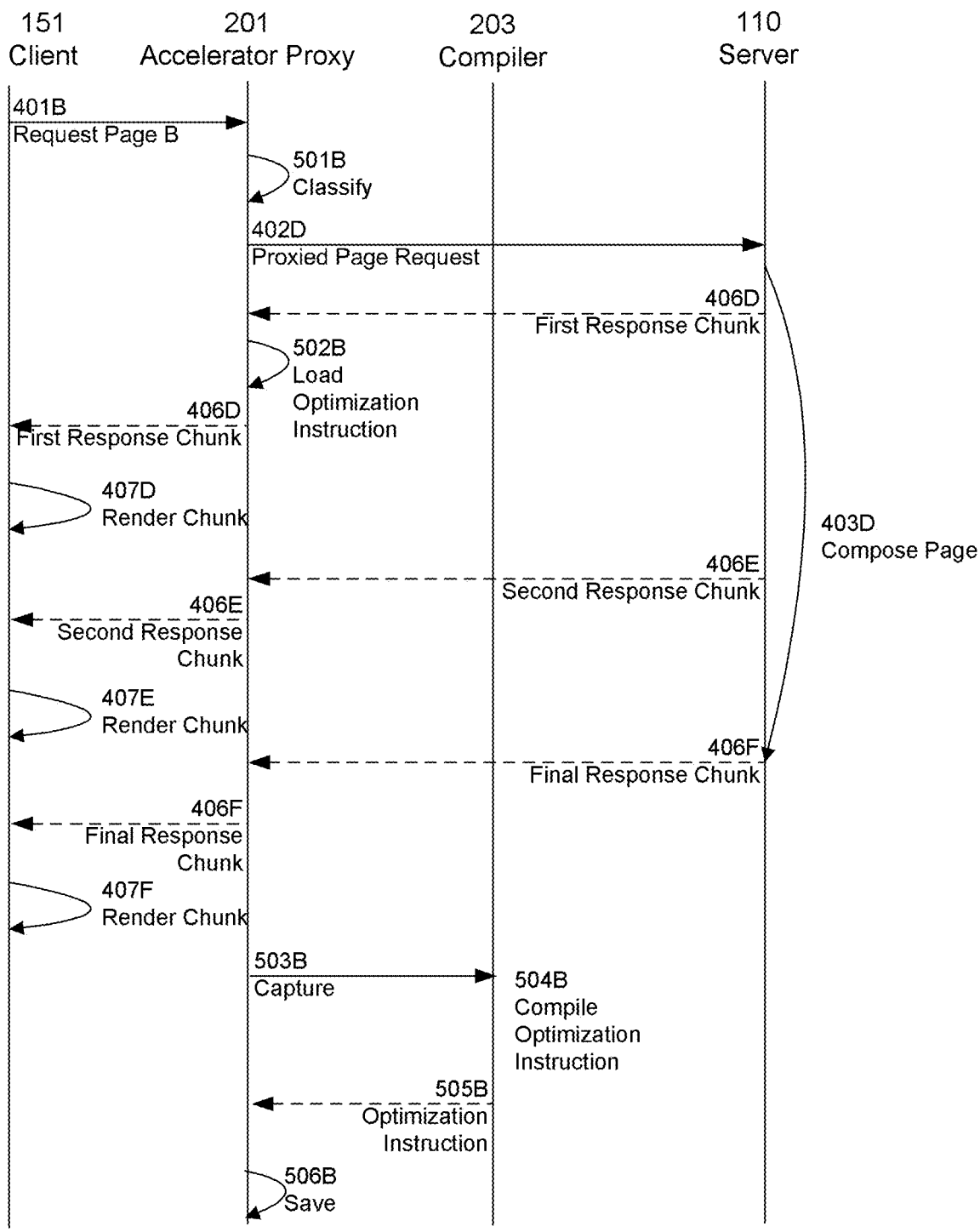

Referring now to FIGS. 5A and 5B, there are shown examples of a learning sequence 303 for generating optimization instructions for handling server responses, according to one embodiment. Learning sequence 303 may be performed, for example, if accelerator proxy 201 attempts to load an acceleration instruction for a particular web page request but finds that it does not exist. In order to apply acceleration to future requests, the HTML response is captured and sent to compiler 203 for analysis. Based on this analysis, compiler 203 generates a HeadStart response including a list of resources that are likely to be used by future requests for the web page. The HeadStart response can take any of a number of suitable forms, such as HTML fragments, HTTP headers, or the like.

In the example of FIG. 5A, client 151 requests 401A page A. Accelerator proxy 201 intercepts request 401A, classifies 501A request 401A, and forwards proxied page request 402C to server 110. Server 110 composes 403C the web page and transmits buffered response 404B containing the composed page to accelerator proxy 201. Accelerator proxy 201 attempts to load 502A an optimization instruction for the requested web page, but in this example no optimization instruction exists, so a null result is obtained. Accelerator proxy 201 forwards buffered response 404B to client 151, which renders 405B the page (for example at browser 112).

Accelerator proxy 201 captures 503A buffered response 404B and transmits it to compiler 203 for analysis. Compiler 203 compiles 504A one or more optimization instruction(s) 505A based on analysis of buffered response 404B, and transmits optimization instruction(s) 505A to accelerator proxy 201. Accelerator proxy 201 saves 506A optimization instruction(s) 505A, for example in database 204 for later use.

FIG. 5B depicts a similar set of steps for a chunked response from server 110. Client 151 requests 401B page B. Accelerator proxy 201 intercepts request 401B, classifies 501B request 401B, and forwards proxied page request 402D to server 110. Server 110 composes 403D the web page, transmitting the response in a series of chunks 406D, 406E, 406F. Although three chunks 406 are depicted, any number of chunks 406 can be used. Upon receiving first response chunk 406D, accelerator proxy 201 attempts to load 502B an optimization instruction for the requested web page, but in this example no optimization instruction exists, so a null result is obtained.

Proxy forwards each response chunk 406D, 406E, 406F to client 151, which renders 407D, 407E, 407F each chunk as it is received (for example at browser 112).

Accelerator proxy 201 captures 503B response chunks 406D, 406E, 406F and transmits them to compiler 203 for analysis. Compiler 203 compiles 504B one or more optimization instruction(s) 505B based on analysis of chunks 406D, 406E, 406F, and transmits optimization instruction(s) 505B to accelerator proxy 201. Accelerator proxy 201 saves 506B optimization instruction(s) 505B, for example in database 204 for later use.

In some embodiments, learning sequence 303 can also include adding custom user content read from configuration, as well as moving content that is already in the unaccelerated responses into the HeadStart section of the response. This is accomplished by adding it to the HeadStart section and removing it from the server response. By moving this content to the HeadStart section, accelerator proxy 201 ensures that, in future responses, this content will be provided to client 151 earlier, so that client 151 can begin retrieving resources identified in the HeadStart section, potentially while server 110 is still composing the web page.

Accelerated Sequence 304

Figure 6A:
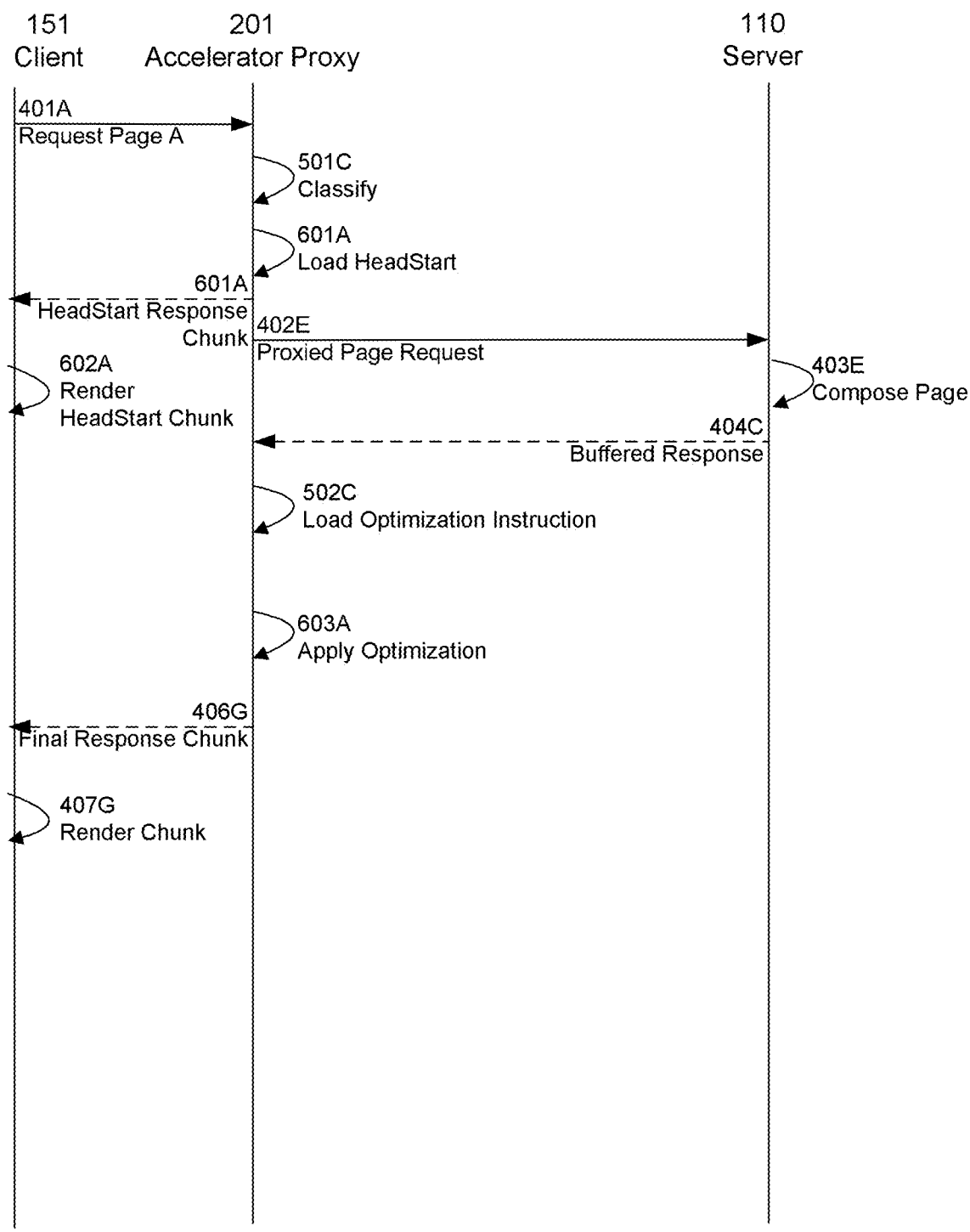
FIGS. 6A and 6B are sequence diagrams illustrating an accelerated sequence for handling page requests according to one embodiment.
Figure 6B:
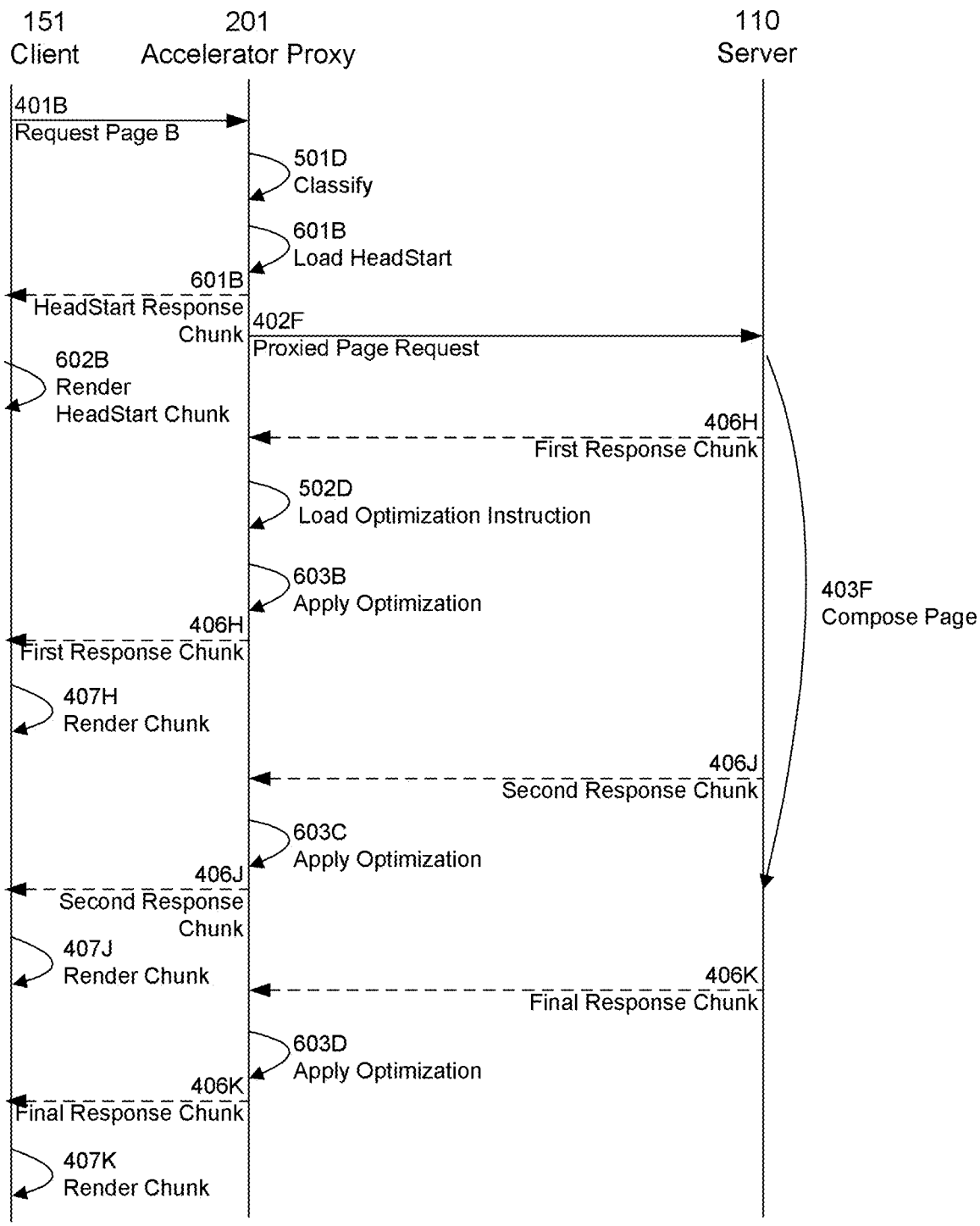

Referring now to FIGS. 6A and 6B, there are shown examples of an accelerated sequence 304 that optimizes the rendering of web pages. As depicted, accelerated sequence 304 includes concurrent behavior: render HeadStart chunk 602A, 602B actions on client 151 take place potentially concurrently with respect to the compose page 403E, 403F actions on server 110. Specifically, the render HeadStart chunk 602A, 602B actions causes client 151 to request resources that are likely to be used during page rendering, and store these resources in local browser cache 111, while server 110 is still composing the web page. When the response (either buffered or chunk-encoded) arrives from server 110, the resources can be loaded from local cache 111, thus improving rendering performance. Loading from local cache 111 can usually be performed much more quickly than retrieval from a remote server. In short, under accelerated sequence 304, performance is improved because client 151 can begin obtaining resources while server 110 is still composing portions of the web page.

FIG. 6A depicts an example wherein server 110 provides a buffered response 404C. Client 151 requests 401A page A. Accelerator proxy 201 intercepts request 401A, classifies 501C request 401A, and loads a HeadStart response chunk 601A (such as one previously generated by compiler 203 and stored at database 204). In one embodiment, classifying 501C request 401A includes determining which resources are likely to be needed by client 151 in rendering the requested content. Accelerator proxy 201 uses chunked encoding to transmit HeadStart response chunk 601A to client 151, which renders 602A the HeadStart chunk and can begin to fetch resources specified therein. Accelerator proxy 201 forwards proxied page request 402E to server 110. One skilled in the art will recognize the order of sending response 601A and request 402E is merely exemplary.

Server 110 composes 403E the web page and transmits buffered response 404C containing the composed page to accelerator proxy 201.

For illustrative purposes, FIG. 6A also depicts load optimization instruction action 502C and apply optimization action 603A. These are independent from the load HeadStart action 601A, and may be omitted. These actions are depicted in FIG. 6A to illustrate that, in one embodiment, other optimization instructions unrelated to HeadStart techniques can be handled by accelerator proxy 201. Examples of optimization instructions that can be used in this context are described in related U.S. Utility application Ser. No. 12/426,909 for "Extensible, Asynchronous, Centralized Analysis and Optimization of Server Responses to Client Requests,", filed Apr. 20, 2009, the disclosure of which is incorporated herein by reference.

Accelerator proxy 201 forwards final response chunk 406G to client 151, including the completed page as composed by server 110. Client 151 renders 407G the received chunk, so that the requested page can be displayed in its complete form. In some embodiments, rendering 407G of the requested page can include rendering of additional resources that were requested based on rendering 602A of the HeadStart chunk (this is shown, for example, in FIG. 7, 704A).

FIG. 6B depicts a similar set of steps for a chunked response from server 110. Client 151 requests 401B page B. Accelerator proxy 201 intercepts request 401B, classifies 501D request 401B, and loads a HeadStart response chunk 601B (such as one previously generated by compiler 203 and stored at database 204). Accelerator proxy 201 uses chunked encoding to transmit HeadStart response chunk 601B to client 151, which renders 602B the HeadStart chunk and can begin to fetch resources specified therein. Accelerator proxy 201 forwards proxied page request 402F to server 110. One skilled in the art will recognize the order of sending response 601B and request 402F is merely exemplary.

Server 110 composes 403F the web page, transmitting the response in a series of chunks 406H, 406J, 406K. Although three chunks 406 are depicted, any number of chunks 406 can be used.

For illustrative purposes, FIG. 6B also depicts load optimization instruction action 502D and apply optimization actions 603B, 603C, 603D. These are independent from the load HeadStart action 601B, and may be omitted. These actions are depicted in FIG. 6B to illustrate that, in one embodiment, other optimization instructions unrelated to HeadStart techniques can be handled by accelerator proxy 201. In one embodiment, optimizations 603 are applied to each chunk 406 as it is received from server 110.

Accelerator proxy 201 forwards each response chunk 406H, 406J, 406K to client 151, which renders 407H, 407J, 407K each chunk as it is received (for example at browser 112), so that the requested page can be displayed in its complete form. In some embodiments, rendering of the requested page can include rendering of additional resources that were requested based on rendering 602B of the HeadStart chunk (this is shown, for example as step 704A of FIG. 7).

Alternate Accelerated Sequence 304B

The above-described method for transmitting HeadStart responses in a chunked-encoded fashion is merely one example of a mechanism by which such information can be transmitted to client 151. In an alternative embodiment, HeadStart responses (including lists of resources for client 151 to retrieve) can be transmitted as HTTP headers, referred to herein as HeadStart headers.

Figure 7:
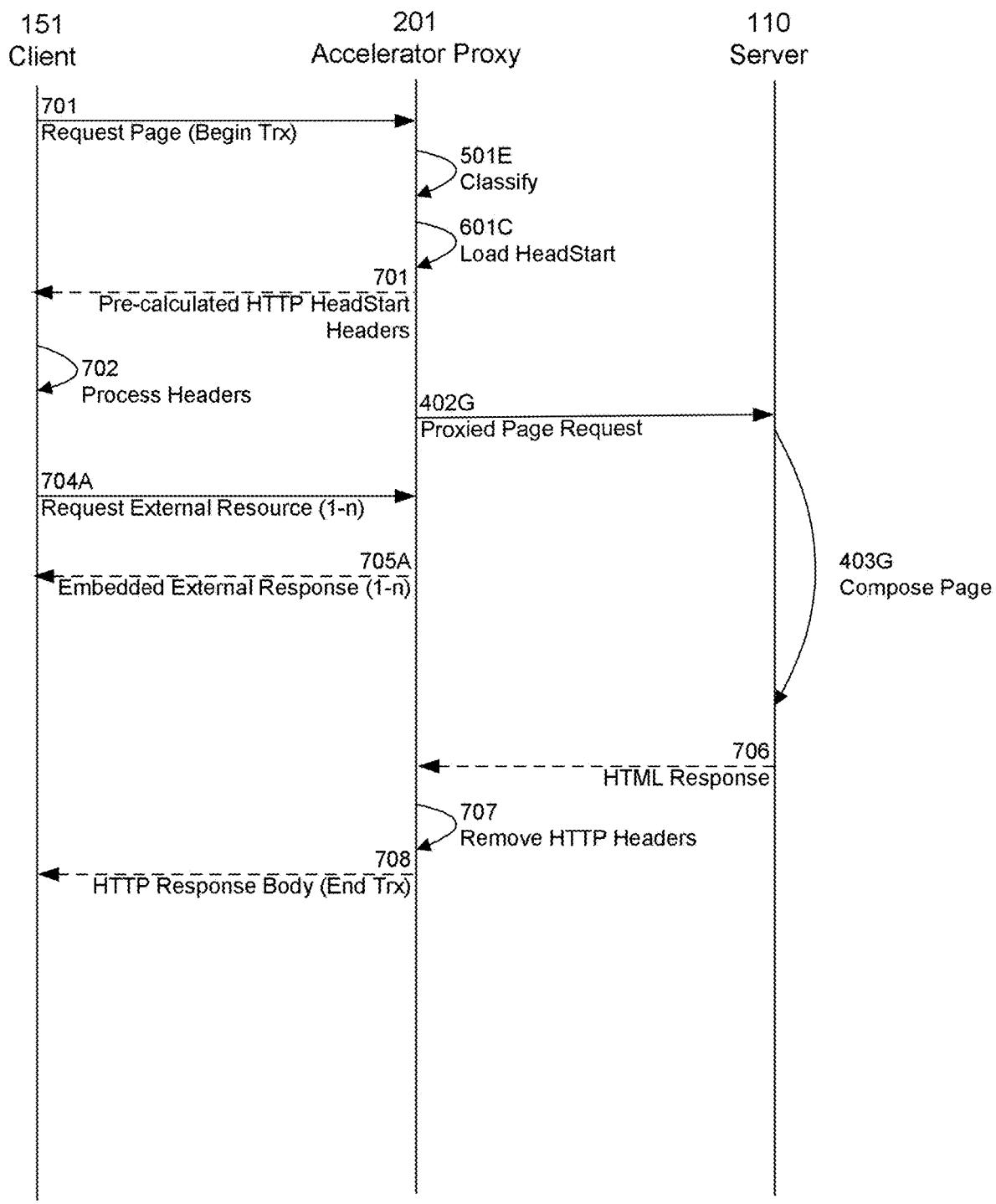
FIG. 7 is a sequence diagram illustrating an alternate accelerated sequence for handling page requests according to one embodiment.
}

Referring now to FIG. 7, there is shown an example of a sequence diagram illustrating an alternate accelerated sequence 304B for handling page requests, wherein HeadStart responses are transmitted as HTTP headers.

This diagram illustrates an embodiment of the invention in which HeadStart responses are transmitted as HTTP headers. These HeadStart responses contain lists of links to resources to be used by client 151 in rendering the web page.

In contrast to conventional HTTP responses that use HTTP headers for resource loading, the method of the present invention causes HTTP headers containing the resource loading directives to be sent back to the client substantially immediately by accelerator proxy 201. Such directives can be transmitted by accelerator proxy 201 without first receiving a response from server 110, thus improving response time.

Client 151 issues a request for a page 701; this request forms the beginning of a transaction such as an HTTP transaction. One skilled in the art will recognize that references to the HTTP protocol are exemplary, and that the system of the present invention can operate with any protocol used to implement client requests and server responses for delivery of content over a network. Similarly, one skilled in the art will recognize that references to HTTP headers are exemplary, and that the system of the present invention can employ other forms of response metadata.

Accelerator proxy 201 intercepts request 701, classifies 501E request 701, and loads a HeadStart response 601C (such as one previously generated by compiler 203 and stored at database 204). Accelerator proxy 201 transmits pre-calculated HTTP HeadStart headers 701 including lists indicating resources client 151 should retrieve.

In one embodiment, a response connection between accelerator proxy 201 and client 151 is held open while proxied page request 402G is transmitted to server 110 and server 110 composes 403G the web page in response. While server 110 composes 403G the web page, in one embodiment, client 151 processes 702 HeadStart headers and requests 704A and receives 705A external resources as specified in the headers. In such an embodiment, accelerator proxy 201 may store certain resources in its cache 220 so that it can respond to client 151 requests for such content. In one embodiment, the external resources 705A are static portions of the page that are more easily cached at accelerator proxy 201, while dynamic portions are generated by server 110.

In some embodiments, some browsers 112 do not support an HTTP header directive capable of loading a resource. Accordingly, in such an embodiment, pre-calculated headers may be previously stored at accelerator proxy 201 so that they are ready for use and can be transmitted to client 151 even if browser 112 does not support an HTTP header directive capable of loading a resource.

Once web browser 110 has finished composing 403G the web page, it transmits HTML response 706 to accelerator proxy 201. Accelerator proxy may possibly add or remove some 707 HTTP headers from response 706 (for example to remove headers which were already sent with response 701 or to provide additional optimizations). HTTP response body 708 is then transmitted to client 151 for rendering thereon. Client 151 may also use received resources in rendering the web page. Transmission of HTTP response body 708 to client 151 ends the HTTP transaction.

Exception Sequence 305

Figure 8A:
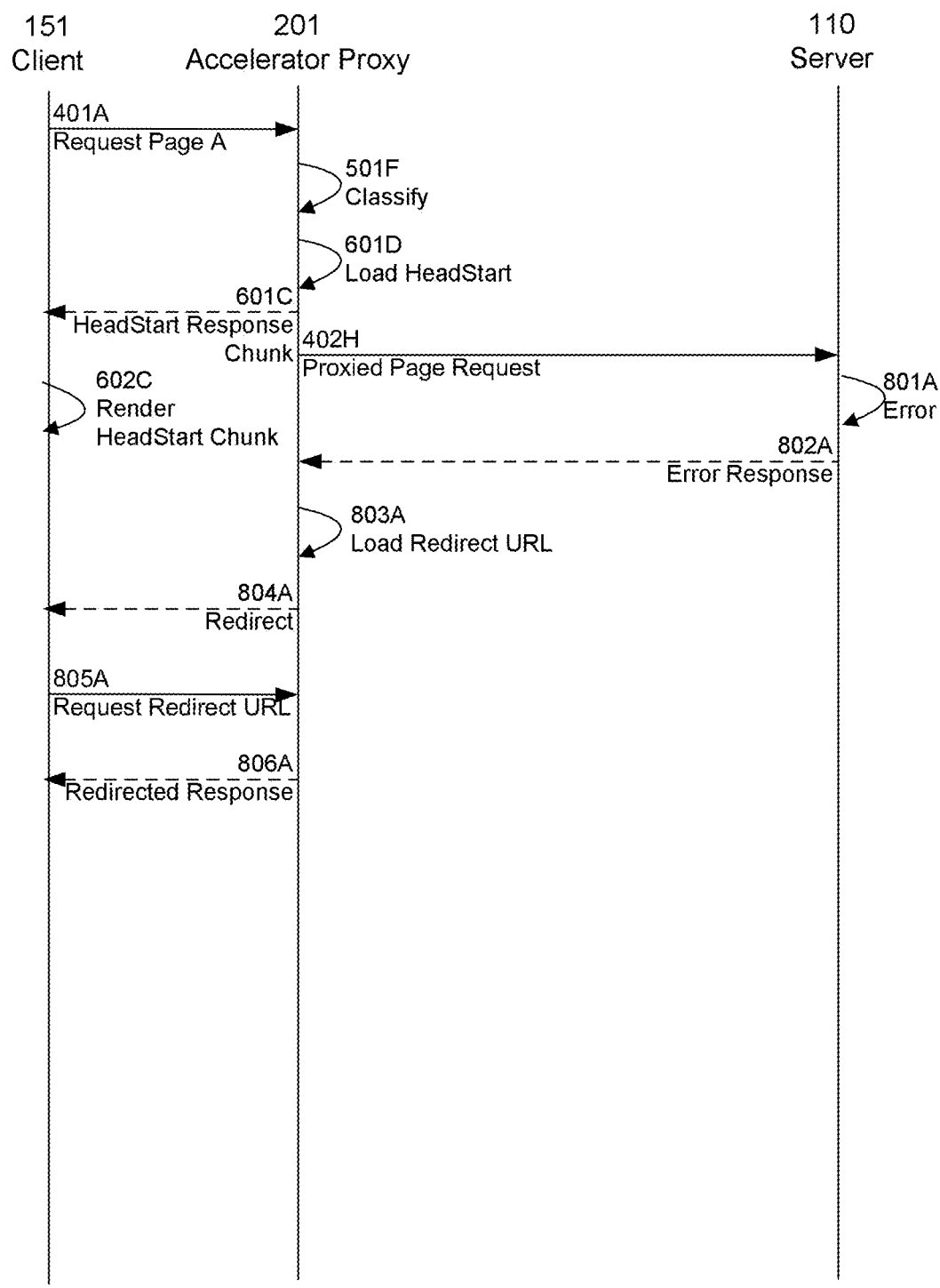
FIGS. 8A and 8B are sequence diagrams illustrating a sequence for handling exceptions according to one embodiment.
Figure 8B:
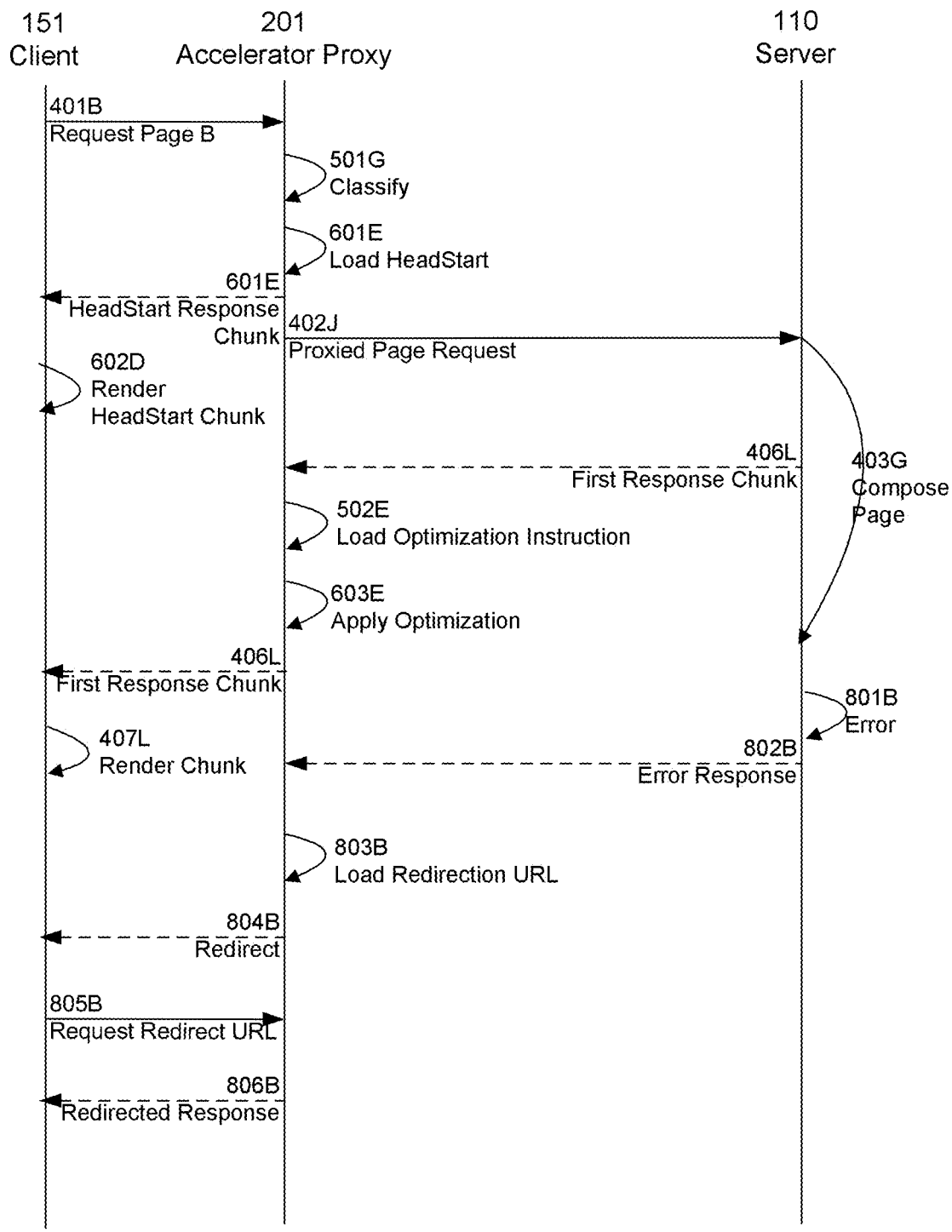

Referring now to FIGS. 8A and 8B, there are shown examples of a sequence 305 for handling exceptions (errors) according to one embodiment.

In some situations, if a remote error occurs at either accelerator proxy 201 or server 110, it may not be possible to use standard error behavior handling. This is due to the fact that, in one embodiment, accelerator proxy 201 returns a "success" result code (such as code "200") before it knows the actual result code that will be returned by server 110, so as to enable client 151 to begin processing the HeadStart chunk. Accordingly, in such an embodiment, if server 110 subsequently returns a non-200 result code, a custom sequence 305, as depicted in FIGS. 8A and 8B, is invoked to handle the exception.

Client 151 requests 401A page A. Accelerator proxy 201 intercepts request 401A, classifies 501F request 401A, and loads a HeadStart response chunk 601D (such as one previously generated by compiler 203 and stored at database 204). Accelerator proxy 201 uses chunked encoding to transmit HeadStart response chunk 601C to client 151, which renders 602C the HeadStart chunk and can begin to fetch resources specified therein. Accelerator proxy 201 forwards proxied page request 402H to server 110.

In this example, server 110 experiences an error 801A, causing it to return error response 802A (such as a result code other than "200"). A client-side redirection procedure is used to carry out special case processing. This may involve, for example, redirecting client 151 to an error page that reflects the original error thrown by server 110. Thus, accelerator proxy 201 loads 803A a redirect URL, and transmits redirect instruction 804A to client 151. Client 151 requests 805A the page specified by the redirect URL, and accelerator proxy 201 (or some other resource) returns redirected response 806A.

FIG. 8B depicts a similar set of steps for a chunked response from server 110. Client 151 requests 401B page B. Accelerator proxy 201 intercepts request 401B, classifies 501G request 401B, and loads a HeadStart response chunk 601E (such as one previously generated by compiler 203 and stored at database 204). Accelerator proxy 201 uses chunked encoding to transmit HeadStart response chunk 601E to client 151, which renders 602D the HeadStart chunk and can begin to fetch resources specified therein. Accelerator proxy 201 forwards proxied page request 402J to server 110.

Server 110 attempts to compose 403G the web page, and transmits first response chunk 406L as normal. Accelerator proxy 201 loads 502E an optimization instruction and applies 603E the loaded optimization action, although such optimization steps are independent from the load HeadStart action 601E, and may be omitted.

Proxy forwards first response chunk 406L to client 151, which renders 407L the chunk (for example at browser 112).

In the example, server 110 experiences an error 801B after returning first response chunk 406L, causing it to return error response 802B (such as a result code other than "200"). As in the example of FIG. 8A, a client-side redirection procedure is used to carry out special case processing. This may involve, for example, redirecting client 151 to an error page that reflects the original error thrown by server 110. Thus, accelerator proxy 201 loads 803B a redirect URL, and transmits redirect instruction 804B to client 151. Client 151 requests 805B the page specified by the redirect URL, and accelerator proxy 201 (or some other resource) returns redirected response 806B.

Other mechanisms for error handling can be used. For example, for certain cases (such as a "401" result code, signifying Access Denied), accelerator proxy 201 can utilize pre-configured user data to determine how to respond. In another embodiment, the error or action is included within the document that already has the HeadStart segment (error inclusion). One skilled in the art will recognize that the invention can reconcile various forms of error responses using a combination of forwarding, redirecting, and/or error inclusion.

Edge Accelerated Sequence 306

Figure 9A:
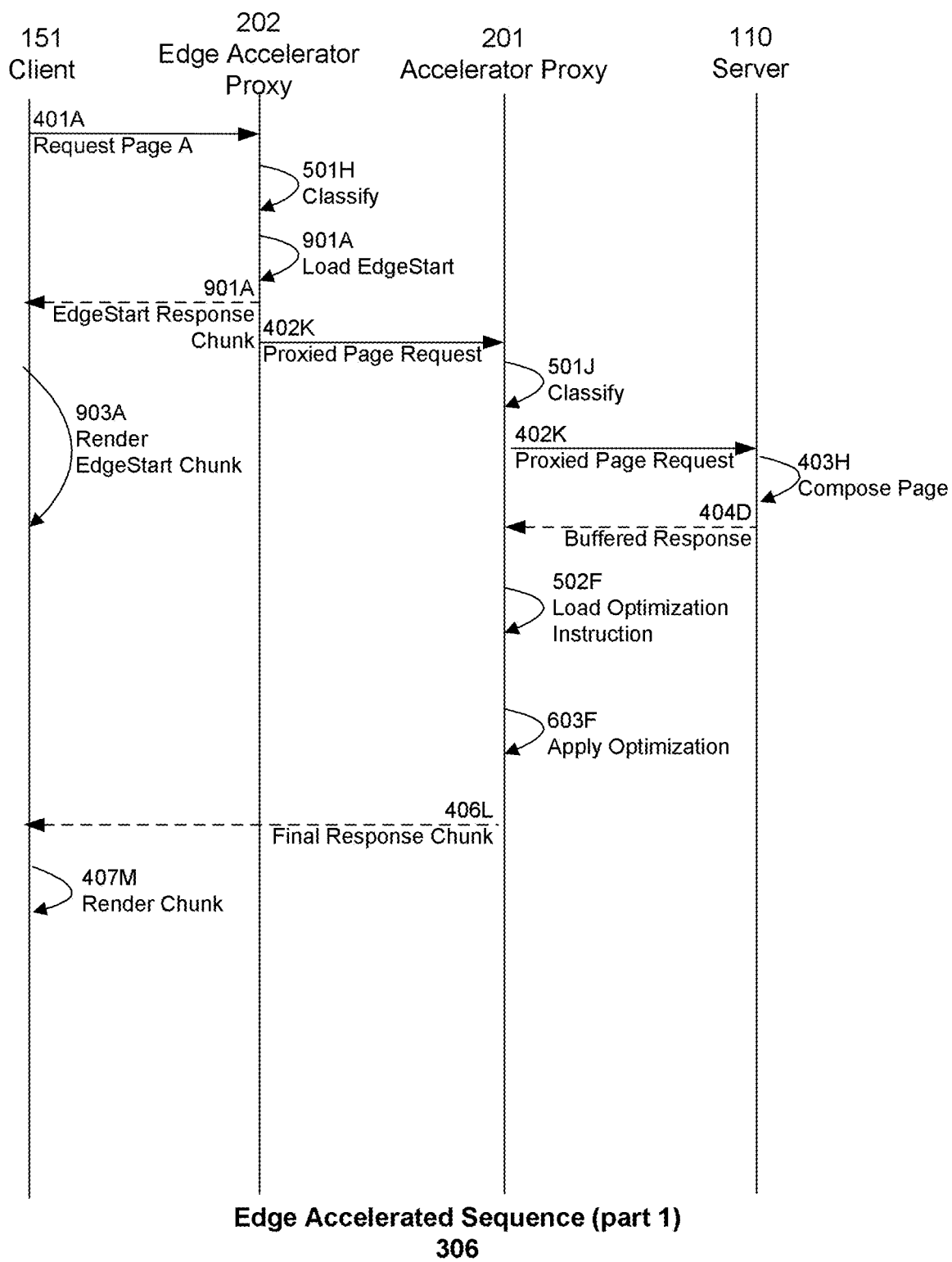
FIGS. 9A and 9B are sequence diagrams illustrating an edge accelerated sequence for handling page requests according to one embodiment.
Figure 9B:
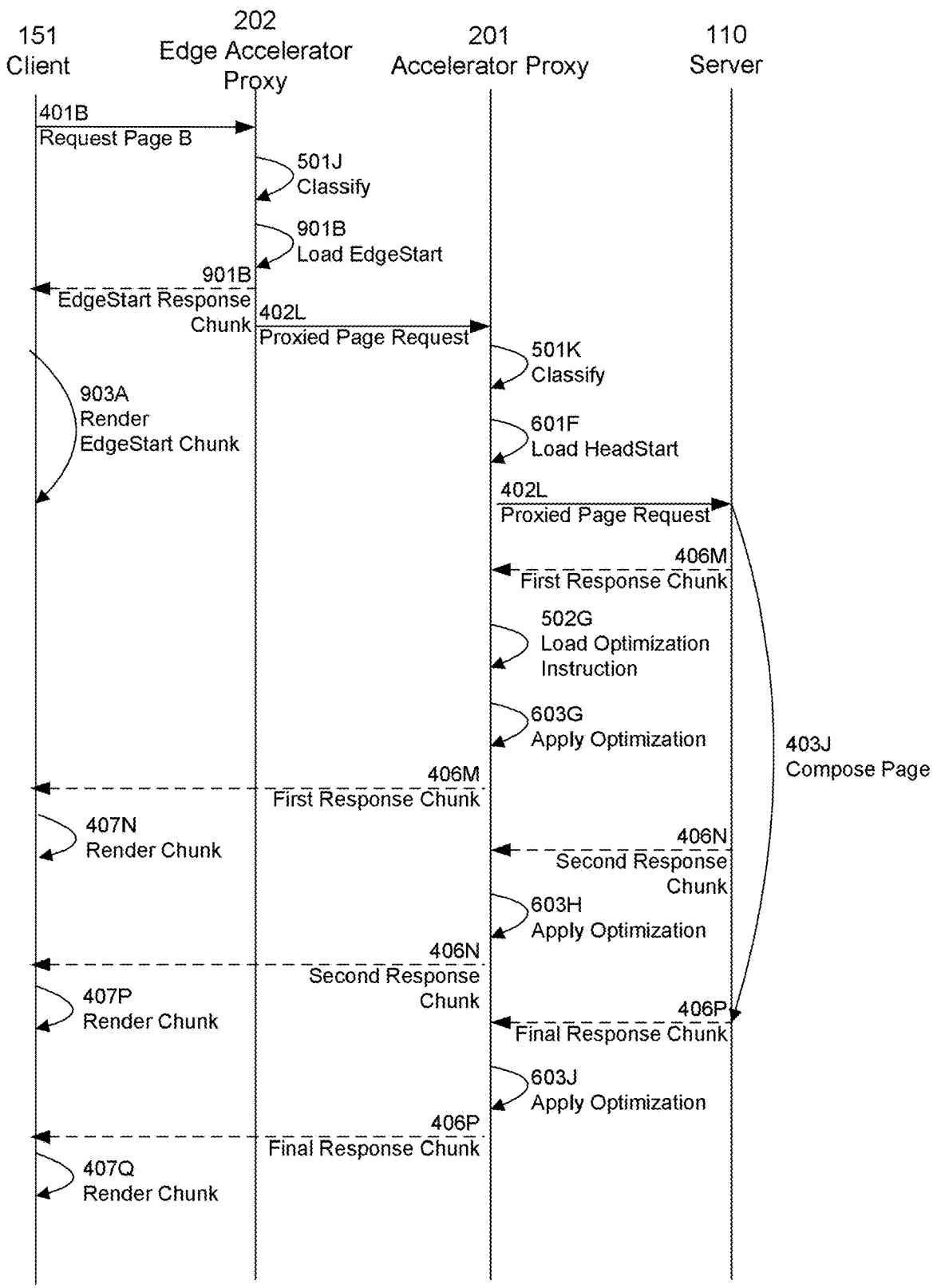

Referring now to FIGS. 9A and 9B, there are shown examples of an edge accelerated sequence 306, wherein the techniques of the present invention operate in a network wherein certain nodes are located logically closer to clients 151 which they service, so as to provide faster response time to those clients 151; such a network is referred to as an "edge network". The nodes that are placed at such locations closer to clients 151 are referred to as "edge nodes" 205. An edge network is a form of deployment wherein some nodes (which can include servers, proxies, routers or accelerators) of the network are logically dispersed so as to have some nodes logically closer to some clients in an effort to provide faster response times to those clients. These dispersed nodes are referred to as "edge nodes". Logically dispersed nodes are often also geographically dispersed, although there is no requirement to do so. Geographic dispersion may be beneficial because it may take more time to transmit information over long distances than over short distances. Content delivery services often duplicate content in multiple dispersed edge nodes in an edge network.

In such an embodiment, an edge accelerator proxy 202 is installed on one or more of the edge nodes and operates as a logical extension of the accelerator proxy 201. The logical location of edge accelerator proxy 202 allows it to respond to client requests more quickly.

Edge accelerator proxy 202 classifies the client request (for example, by mapping it to an EdgeStart instruction) and begins responding to it. Concurrently with this activity, the accelerator proxy 201 and server 110 respond to the request, as described in more detail below. Thus, in this sequence, the system of the present invention leverages the logical proximity provided by the edge network to increase the speed with which the HeadStart response chunk is returned. In this embodiment, the HeadStart response chunk is referred to as an "EdgeStart response chunk" 901A; however, the terms "HeadStart" and "EdgeStart" are equivalent.

Client 151 requests 401A page A. Edge accelerator proxy 202 intercepts request 401A, classifies 501H request 401A, and loads EdgeStart response chunk 901A. As with the HeadStart response chunk, EdgeStart response chunk 901A can be previously generated by compiler 203 and stored at database 204. Edge accelerator proxy 202 uses chunked encoding to transmit EdgeStart response chunk 901A to client 151, which renders 903A the EdgeStart chunk and can begin to fetch resources specified therein.

Edge accelerator proxy 202 forwards proxied page request 402K to accelerator proxy 201. Accelerator proxy 201 performs its own classify 501J action on proxied page request 402K, and forwards proxied page request 402K to server 110. Server 110 composes 403H the web page and transmits buffered response 404D containing the composed page to accelerator proxy 201.

For illustrative purposes, FIG. 9A also depicts load optimization instruction action 502F and apply optimization action 603F. These are independent from the load EdgeStart action 901A, and may be omitted. These actions are depicted in FIG. 9A to illustrate that, in one embodiment, other optimization instructions unrelated to EdgeStart techniques can be handled by accelerator proxy 201.

Accelerator proxy 201 forwards final response chunk 406L to client 151, including the completed page as composed by server 110. Client 151 renders 407M the received chunk, so that the requested page can be displayed in its complete form. In some embodiments, rendering of the requested page can include rendering of additional external resources that are requested based on rendering 903A of the EdgeStart chunk (this is shown, for example, in FIG. 7, 704A).

FIG. 9B depicts a similar set of steps for a chunked response from server 110. Client 151 requests 401B page B. Edge accelerator proxy 202 intercepts request 401B, classifies 501J request 401B, and loads an EdgeStart response chunk 901B. Edge accelerator proxy 202 uses chunked encoding to transmit EdgeStart response chunk 901B to client 151, which renders 903A the EdgeStart chunk and can begin to fetch resources specified therein.

Edge accelerator proxy 202 forwards proxied page request 402L to accelerator proxy 201. Accelerator proxy 201 performs its own classify 501K action on proxied page request 402L, and loads 601F a HeadStart response. Accelerator proxy 201 forwards proxied page request 402L to server 110.

Server 110 composes 403J the web page, transmitting the response in a series of chunks 406M, 406N, 406P. Although three chunks 406 are depicted, any number of chunks 406 can be used.

For illustrative purposes, FIG. 9B also depicts load optimization instruction action 502G and apply optimization actions 603G, 603H, 603J. These are independent from the load EdgeStart action 901B, and may be omitted. These actions are depicted in FIG. 9B to illustrate that, in one embodiment, other optimization instructions unrelated to EdgeStart techniques can be handled by accelerator proxy 201. In one embodiment, optimizations 603 are applied to each chunk 406 as it is received from server 110.

Accelerator proxy 201 forwards each response chunk 406M, 406N, 406P to client 151, which renders 407N, 407P, 407Q each chunk as it is received (for example at browser 112), so that the requested page can be displayed in its complete form. In some embodiments, rendering of the requested page can include rendering of additional external resources that are requested based on rendering 903A of the HeadStart chunk (this is shown, for example, at step 704A of FIG. 7.

In another embodiment, some or all of the resources in the EdgeStart list are stored in cache 220 of edge accelerator proxy 202 in advance of the page being requested. Since edge accelerator proxy 202 may be located logically proximate to client 151, such caching can improve performance. In one embodiment, the resources are placed in cache 220 at the same time as the EdgeStart list. When edge accelerator proxy 202 provides an EdgeStart response, some or all of the resources specified in the EdgeStart list are also cached so that they can be easily and quickly provided to client 151. In another embodiment, the resources may be pre-fetched by cache 220 when sending the EdgeStart list to client 151, rather than waiting for client 151 to request those resources.

Figure 10:
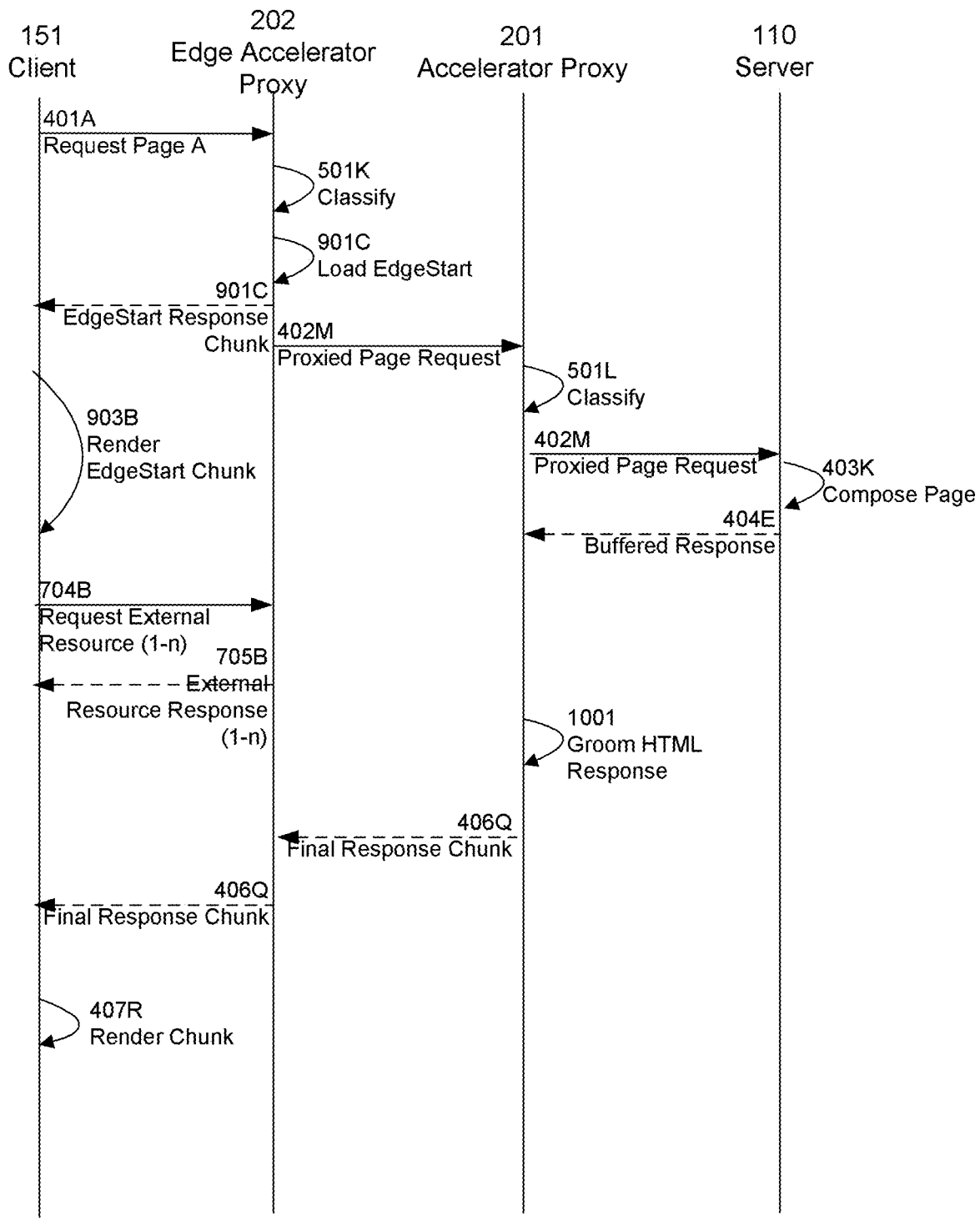
FIG. 10 is a sequence diagram illustrating an alternate edge accelerated sequence for handling page requests according to one embodiment.

Referring now to FIG. 10, there is shown an example of an edge accelerated sequence 306 according to this alternate embodiment. Client 151 requests 401A page A. Edge accelerator proxy 202 intercepts request 401A, classifies 501K request 401A, and loads EdgeStart response chunk 901C. Edge accelerator proxy 202 uses chunked encoding to transmit EdgeStart response chunk 901C to client 151, which renders 903B the EdgeStart chunk.

Edge accelerator proxy 202 forwards proxied page request 402M to accelerator proxy 201. Accelerator proxy 201 performs its own classify 501L action on proxied page request 402M, and forwards proxied page request 402M to server 110. Server 110 composes 403K the web page and transmits buffered response 404E containing the composed page to accelerator proxy 201.

Once client 151 has received EdgeStart response chunk 901C, it can begin to fetch resources specified therein. In this embodiment, since some or all of these resources are stored in cache 220 of edge accelerator proxy 202, client 151 request 704B these external resources from edge accelerator proxy 202. Edge accelerator proxy 202 returns the requested external resources 705B. In some embodiments, these resources may be retrieved from other sources.

In one embodiment, the external resources 705B are static portions of the page, which are more easily cached at edge accelerator proxy 202, while dynamic portions are generated by server 110.

In some cases, the resources in the EdgeStart list may all be fetched by client 151 by the time buffered response 404E is returned by server 110. In this case, the fetching of the EdgeStart resources by client 151 can run in parallel with compose page action 403K taking place at server 110. In one embodiment, accelerator proxy 201 performs a groom HTML response action 1001 to response 404E in which information that is already sent to client 151, or no longer needs to be sent to client 151, is removed from the response.

Accelerator proxy 201 transmits final response chunk 406Q to edge accelerator proxy 202, which forwards it to client 151, including the completed page as composed by server 110. Client 151 renders 407R the received chunk, so that the requested page can be displayed in its complete form. Rendering 407R of the requested page can include rendering of additional resources that were requested and received in steps 704B and 705B.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of generating optimization instructions for accelerating traffic between a client and a server, comprising:

at a proxy device communicatively connected to the client and the server via a communications network, performing the steps of:

receiving intercepted responses, wherein each intercepted response is sent by the server in response to a request for content from the client;

analyzing the received responses to determine at least a context of each response;

compiling at least one optimization instruction based on the determined contexts of the responses; and saving the compiled at least one optimization instruction in a storage device so that the compiled at least one optimization instruction is available for transmission by at least the proxy device in response to a subsequent request from a client, thereby enabling the proxy device to transmit the compiled at least one optimization instruction while the server concurrently composes a response to the subsequent request.

2. The method of claim 1, wherein the compilation of the at least one optimization instruction is performed as an offline process, wherein the compilation is separated from processing the requests and the responses.

3. The method of claim 1, wherein the intercepted responses include at least one of: traffic flows between the client and the server, and simulated traffic.

4. The method of claim 1, wherein each intercepted response includes a plurality of response chunks.

5. The method of the 3, wherein the intercepted responses are gathered by a proxy device communicatively connected between the client and the server via a communications network.

6. The method of claim 5, wherein the at least one optimization instruction is loaded to the proxy device to accelerate the traffic, wherein the traffic is at least a hypertext transfer protocol traffic.

7. The method of claim 1, wherein each received response is a hypertext transfer protocol (HTTP) response.

8. The method of claim 7, wherein the context of each received response includes at least one of: a hypertext markup language text and a HTTP header.

9. The method of claim 1, wherein the compiled at least one optimization instruction includes a list of resources, wherein the list of resources is utilized to at least partially fulfill the request for content sent by the client.

10. The method of claim 9, wherein each resource in the list of resources includes at least one of: an image, a script file, and a cascading style sheet.

11. The method of claim 9, wherein the list of resources is embedded in a hypertext markup language fragment response.

12. A non-transitory computer readable medium having stored thereon instructions for causing a processing circuitry to perform a process for generating optimization instructions for accelerating traffic between a client and a server, the process comprising:

receiving intercepted responses, wherein each intercepted response is sent by the server in response to a request for content from the client;

analyzing the received responses to determine at least a context of each response;

compiling at least one optimization instruction based on the determined contexts of the responses; and saving the compiled at least one optimization instruction in a storage device so that the compiled at least one optimization instruction is available for transmission by at least the proxy device in response to a subsequent request from a client, thereby enabling the proxy device to transmit the compiled at least one optimization instruction while the server concurrently composes a response to the subsequent request.

13. A system for generating optimization instructions for accelerating traffic between a client and a server, comprising:

a processing circuitry; and a memory, the memory containing instructions that, when executed by the processing circuitry, configure the system to:

receive intercepted responses, wherein each intercepted response is sent by the server in response to a request for content from the client;

analyze the received responses to determine at least a context of each response;

compile at least one optimization instruction based on the determined contexts of the responses; and save the compiled at least one optimization instruction in a storage device so that the compiled at least one optimization instruction is available for transmission by at least the proxy device in response to a subsequent request from a client, thereby enabling the proxy device to transmit the compiled at least one optimization instruction while the server concurrently composes a response to the subsequent request.

14. The system of claim 13, wherein the system is configured to compile the at least one optimization instruction as an offline process, wherein the compilation is separated from processing the requests and the responses.

15. The system of claim 13, wherein the intercepted responses include at least one of: traffic flows between the client and the server, and simulated traffic.

16. The system of claim 13, wherein each intercepted response includes a plurality of response chunks.

17. The system of the 16, wherein the intercepted responses are gathered by a proxy device communicatively connected between the client and the server via a communications network.

18. The system of claim 17, wherein the at least one optimization instruction is loaded to the proxy device to accelerate the traffic, wherein the traffic is at least a hypertext transfer protocol traffic.

19. The system of claim 13, wherein each received response is a hypertext transfer protocol (HTTP) response.

20. The system of claim 19, wherein the context of each received response includes at least one of: a hypertext markup language text and a HTTP header.

21. The system of claim 13, wherein the compiled at least one optimization instruction includes a list of resources, wherein the list of resources is utilized to at least partially fulfill the request for content sent by the client.

22. The system of claim 21, wherein the list of resources is embedded in a hypertext markup language fragment response.

23. The system of claim 22, wherein the system is further configured to:

generate a HeadStart response based on the resources indicated in the at least one optimization instruction.

24. The method of claim 11, further comprising:

generating a HeadStart response based on the resources indicated in the at least one optimization instruction.

25. The system of claim 21, wherein each resource in the list of resources includes at least one of: an image, a script file, and a cascading style sheet.

* * * * *